United States Patent
Cavage et al.

(10) Patent No.: US 11,411,888 B2
(45) Date of Patent: Aug. 9, 2022

(54) DISTRIBUTED POLICY ENFORCEMENT WITH OPTIMIZING POLICY TRANSFORMATIONS

(71) Applicant: Amazon Technologies, Inc., Seattle, WA (US)

(72) Inventors: Mark Cavage, Seattle, WA (US); Yunong Xiao, Seattle, WA (US); Bradley Jeffrey Behm, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 220 days.

(21) Appl. No.: 16/911,298

(22) Filed: Jun. 24, 2020

(65) Prior Publication Data

US 2020/0328985 A1 Oct. 15, 2020

Related U.S. Application Data

(63) Continuation of application No. 14/992,964, filed on Jan. 11, 2016, now Pat. No. 10,721,184, which is a continuation of application No. 12/961,104, filed on Dec. 6, 2010, now Pat. No. 9,237,155.

(51) Int. Cl.
*H04L 29/06* (2006.01)
*H04L 47/70* (2022.01)
(Continued)

(52) U.S. Cl.
CPC .......... *H04L 47/822* (2013.01); *G06F 9/5077* (2013.01); *G06F 16/22* (2019.01);
(Continued)

(58) Field of Classification Search
CPC ..... H04L 47/822; H04L 63/10; H04L 63/102; H04L 63/0815; H04L 63/108; G06F 9/5077; G06F 16/22
See application file for complete search history.

(56) References Cited

U.S. PATENT DOCUMENTS

| 5,179,591 A | 1/1993 | Hardy et al. |
| 5,200,999 A | 4/1993 | Matyas et al. |

(Continued)

FOREIGN PATENT DOCUMENTS

| WO | WO2006077822 | 7/2006 |
| WO | WO2008024705 | 2/2008 |

(Continued)

OTHER PUBLICATIONS

Amazon, "Amazon Prime Video—security considerations," Amazon. com General Help Forum, http://www.amazon.com/gp/help/customer/forums?ie=UTF8&cdForum=Fx2NFGOONPZEXIP&cdPage=1&cdSort=newest&cdThread=Tx18VZVGGU0Y32, latest reply Jun. 17, 2013, 3 pages.

(Continued)

*Primary Examiner* — Harunur Rashid
(74) *Attorney, Agent, or Firm* — Davis Wright Tremaine LLP

(57) ABSTRACT

A request is obtained that, if fulfilled, is operable to access a computing resource, with the request including an indication to evaluate the request in a verification mode while inhibiting fulfilment of the request. Responsive to the request, a policy applicable to the request is determined, decision data that is relevant to the policy is obtained, and the request is evaluated based at least in part on the policy and the decision data to produce an evaluation result. Further responsive to the request, fulfillment of the request is inhibited, a verification report is generated based at least in part on the evaluation result, and a notification is provided indicating that the verification report is generated.

20 Claims, 16 Drawing Sheets

(51) Int. Cl.
   *H04L 9/40* (2022.01)
   *G06F 16/22* (2019.01)
   *G06F 9/50* (2006.01)

(52) U.S. Cl.
   CPC ............ *H04L 63/10* (2013.01); *H04L 63/102* (2013.01); *H04L 63/0815* (2013.01); *H04L 63/108* (2013.01)

(56) References Cited

U.S. PATENT DOCUMENTS

| | | |
|---|---|---|
| 5,497,421 A | 3/1996 | Kaufman et al. |
| 6,044,466 A | 3/2000 | Anand et al. |
| 6,084,969 A | 7/2000 | Wright et al. |
| 6,097,817 A | 8/2000 | Bilgic et al. |
| 6,158,010 A * | 12/2000 | Moriconi ............ H04L 63/1425 710/39 |
| 6,185,316 B1 | 2/2001 | Buffam |
| 6,453,416 B1 | 9/2002 | Epstein |
| 6,826,686 B1 | 11/2004 | Peyravian et al. |
| 6,851,054 B2 | 2/2005 | Wheeler et al. |
| 6,957,393 B2 | 10/2005 | Fano et al. |
| 6,959,394 B1 | 10/2005 | Brickell et al. |
| 6,985,583 B1 | 1/2006 | Brainard et al. |
| 7,010,689 B1 | 3/2006 | Matyas et al. |
| 7,073,195 B2 | 7/2006 | Brickell et al. |
| 7,139,917 B2 | 11/2006 | Jablon |
| 7,228,417 B2 | 6/2007 | Roskind |
| 7,320,076 B2 | 1/2008 | Caronni |
| 7,512,965 B1 | 3/2009 | Amdur et al. |
| 7,685,430 B1 | 3/2010 | Masurkar |
| 7,721,322 B2 | 5/2010 | Sastry et al. |
| 7,757,271 B2 | 7/2010 | Amdur et al. |
| 7,765,584 B2 | 7/2010 | Roskind |
| 7,836,306 B2 | 11/2010 | Pyle et al. |
| 7,890,767 B2 | 2/2011 | Smith et al. |
| 7,913,084 B2 | 3/2011 | Medvinsky et al. |
| 7,917,764 B2 | 3/2011 | Futa |
| 8,006,289 B2 | 8/2011 | Hinton et al. |
| 8,024,562 B2 | 9/2011 | Gentry et al. |
| 8,041,954 B2 | 10/2011 | Plesman |
| 8,059,820 B2 | 11/2011 | Malaviarachchi et al. |
| 8,086,508 B2 | 12/2011 | Dheer et al. |
| 8,151,116 B2 | 4/2012 | van der Horst et al. |
| 8,201,215 B2 | 6/2012 | Dillaway et al. |
| 8,275,356 B2 | 9/2012 | Hickie |
| 8,332,922 B2 | 12/2012 | Dickinson et al. |
| 8,370,638 B2 | 2/2013 | Duane et al. |
| 8,386,800 B2 | 2/2013 | Kocher et al. |
| 8,387,117 B2 | 2/2013 | Eom et al. |
| 8,418,222 B2 | 4/2013 | Gbadegesin et al. |
| 8,423,759 B2 | 4/2013 | Moreau |
| 8,453,198 B2 | 5/2013 | Band et al. |
| 8,464,058 B1 | 6/2013 | Chen et al. |
| 8,464,354 B2 | 6/2013 | Teow et al. |
| 8,533,772 B2 | 9/2013 | Garg et al. |
| 8,543,916 B2 | 9/2013 | Anderson et al. |
| 8,561,152 B2 | 10/2013 | Novak et al. |
| 8,621,561 B2 | 12/2013 | Cross et al. |
| 8,688,813 B2 | 4/2014 | Maes |
| 8,695,075 B2 | 4/2014 | Anderson et al. |
| 8,739,308 B1 | 5/2014 | Roth |
| 8,745,205 B2 | 6/2014 | Anderson et al. |
| 8,776,190 B1 | 7/2014 | Cavage et al. |
| 8,776,204 B2 | 7/2014 | Faynberg et al. |
| 8,868,923 B1 | 10/2014 | Hamlet et al. |
| 8,892,865 B1 | 11/2014 | Roth |
| 2001/0008013 A1 | 7/2001 | Johnson et al. |
| 2001/0018739 A1 | 8/2001 | Anderson et al. |
| 2002/0016840 A1 | 2/2002 | Herzog et al. |
| 2002/0067832 A1 | 6/2002 | Jablon |
| 2002/0112181 A1 | 8/2002 | Smith |
| 2002/0161723 A1 | 10/2002 | Asokan et al. |
| 2002/0161998 A1 | 10/2002 | Cromer et al. |
| 2002/0162019 A1 | 10/2002 | Berry et al. |
| 2002/0194483 A1 | 12/2002 | Wenocur et al. |
| 2002/0198848 A1 | 12/2002 | Michener |
| 2003/0016826 A1 | 1/2003 | Asano et al. |
| 2003/0041110 A1 | 2/2003 | Wenocur et al. |
| 2003/0135740 A1 | 7/2003 | Talmor et al. |
| 2003/0145197 A1 | 7/2003 | Lee et al. |
| 2003/0149781 A1 | 8/2003 | Yared et al. |
| 2003/0188117 A1 | 10/2003 | Yoshino et al. |
| 2004/0015702 A1 | 1/2004 | Mercredi et al. |
| 2004/0088260 A1 | 5/2004 | Foster et al. |
| 2004/0103096 A1 | 5/2004 | Larsen |
| 2004/0128505 A1 | 7/2004 | Larsen |
| 2004/0128510 A1 | 7/2004 | Larsen |
| 2004/0131185 A1 | 7/2004 | Kakumer |
| 2004/0143733 A1 | 7/2004 | Ophir et al. |
| 2004/0158734 A1 | 8/2004 | Larsen |
| 2004/0162741 A1 * | 8/2004 | Flaxer .................... G06Q 10/10 705/7.26 |
| 2004/0172535 A1 | 9/2004 | Jakobsson et al. |
| 2004/0215650 A1 * | 10/2004 | Shaji .................... H04L 41/082 707/999.102 |
| 2004/0243811 A1 | 12/2004 | Frisch et al. |
| 2005/0021978 A1 * | 1/2005 | Bhat .................... G06F 21/6227 713/182 |
| 2005/0036611 A1 | 2/2005 | Seaton et al. |
| 2005/0043999 A1 | 2/2005 | Ji et al. |
| 2005/0060580 A1 | 3/2005 | Chebolu et al. |
| 2005/0080914 A1 | 4/2005 | Lerner et al. |
| 2005/0132192 A1 | 6/2005 | Jeffries et al. |
| 2005/0132215 A1 | 6/2005 | Wang et al. |
| 2005/0166263 A1 | 7/2005 | Nanopoulos et al. |
| 2005/0235148 A1 | 10/2005 | Scheidt et al. |
| 2005/0273862 A1 | 12/2005 | Benaloh et al. |
| 2005/0278547 A1 | 12/2005 | Hyndman et al. |
| 2006/0070116 A1 | 3/2006 | Park |
| 2006/0075462 A1 | 4/2006 | Golan et al. |
| 2006/0094406 A1 | 5/2006 | Cortegiano |
| 2006/0094410 A1 | 5/2006 | Cortegiano |
| 2006/0100928 A1 | 5/2006 | Waleczak, Jr. et al. |
| 2006/0129817 A1 | 6/2006 | Borneman et al. |
| 2006/0130100 A1 | 6/2006 | Pentland |
| 2006/0149677 A1 | 7/2006 | Shahine et al. |
| 2006/0174125 A1 | 8/2006 | Brookner |
| 2006/0190331 A1 | 8/2006 | Tollinger et al. |
| 2006/0206440 A1 * | 9/2006 | Anderson .............. G06Q 99/00 705/500 |
| 2006/0206925 A1 | 9/2006 | Dillaway et al. |
| 2006/0218625 A1 | 9/2006 | Pearson et al. |
| 2006/0230284 A1 | 10/2006 | Fiske |
| 2006/0256961 A1 | 11/2006 | Brainard et al. |
| 2006/0271785 A1 | 11/2006 | Holtmanns et al. |
| 2006/0282878 A1 | 12/2006 | Stanley et al. |
| 2007/0005955 A1 | 1/2007 | Pyle et al. |
| 2007/0033396 A1 | 2/2007 | Zhang et al. |
| 2007/0037552 A1 | 2/2007 | Lee et al. |
| 2007/0061571 A1 | 3/2007 | Hammes et al. |
| 2007/0061885 A1 | 3/2007 | Hammes et al. |
| 2007/0136361 A1 | 6/2007 | Lee et al. |
| 2007/0157309 A1 | 7/2007 | Bin et al. |
| 2007/0174614 A1 | 7/2007 | Duane et al. |
| 2007/0186102 A1 | 8/2007 | Ng |
| 2007/0195779 A1 | 8/2007 | Judge et al. |
| 2007/0234410 A1 | 10/2007 | Geller |
| 2007/0250706 A1 | 10/2007 | Oba |
| 2007/0277231 A1 | 11/2007 | Medvinsky et al. |
| 2008/0010665 A1 | 1/2008 | Hinton et al. |
| 2008/0040773 A1 | 2/2008 | AlBadarin et al. |
| 2008/0066150 A1 * | 3/2008 | Lim .................... G06F 11/3006 726/1 |
| 2008/0080718 A1 | 4/2008 | Meijer et al. |
| 2008/0083036 A1 | 4/2008 | Ozzie et al. |
| 2008/0163337 A1 | 7/2008 | Tuliani et al. |
| 2008/0168530 A1 | 7/2008 | Kuehr-McLaren et al. |
| 2008/0182592 A1 | 7/2008 | Cha et al. |
| 2008/0222694 A1 | 9/2008 | Nakae |
| 2008/0301444 A1 | 12/2008 | Kim et al. |
| 2008/0301630 A1 | 12/2008 | Arnold et al. |
| 2008/0313719 A1 | 12/2008 | Kaliski, Jr. et al. |
| 2009/0013402 A1 | 1/2009 | Plesman |

(56) References Cited

U.S. PATENT DOCUMENTS

| | | |
|---|---|---|
| 2009/0019134 A1 | 1/2009 | Bellifemine et al. |
| 2009/0049518 A1* | 2/2009 | Roman .................. H04L 41/22 726/1 |
| 2009/0063381 A1* | 3/2009 | Chan ...................... G06Q 10/10 706/47 |
| 2009/0100498 A1* | 4/2009 | Grossi .................... G06Q 10/10 726/1 |
| 2009/0119672 A1 | 5/2009 | Bussard et al. |
| 2009/0172793 A1 | 7/2009 | Newstadt et al. |
| 2009/0210712 A1 | 8/2009 | Fort |
| 2009/0217385 A1 | 8/2009 | Teow et al. |
| 2009/0222747 A1 | 9/2009 | May et al. |
| 2009/0254572 A1 | 10/2009 | Redlich et al. |
| 2009/0254978 A1 | 10/2009 | Rouskov et al. |
| 2009/0307742 A1* | 12/2009 | Forster .................... G06F 21/10 726/1 |
| 2009/0320093 A1 | 12/2009 | Glazier et al. |
| 2010/0001833 A1* | 1/2010 | Alexander .......... H04L 63/0807 340/5.84 |
| 2010/0017603 A1 | 1/2010 | Jones |
| 2010/0037304 A1* | 2/2010 | Canning ............. G06F 21/6218 726/3 |
| 2010/0058060 A1 | 3/2010 | Schneider |
| 2010/0058072 A1 | 3/2010 | Teow et al. |
| 2010/0071056 A1 | 3/2010 | Cheng |
| 2010/0083001 A1 | 4/2010 | Shah et al. |
| 2010/0100941 A1 | 4/2010 | Eom et al. |
| 2010/0111296 A1 | 5/2010 | Brown et al. |
| 2010/0125894 A1 | 5/2010 | Yasrebi et al. |
| 2010/0131756 A1 | 5/2010 | Schneider |
| 2010/0142704 A1 | 6/2010 | Camenisch et al. |
| 2010/0154040 A1* | 6/2010 | Chiu .................. H04L 63/0823 726/5 |
| 2010/0205649 A1 | 8/2010 | Becker et al. |
| 2010/0239095 A1 | 9/2010 | Carter et al. |
| 2010/0251347 A1 | 9/2010 | Roskind |
| 2010/0269156 A1 | 10/2010 | Hohlfeld et al. |
| 2010/0290476 A1 | 11/2010 | Brindle et al. |
| 2010/0332845 A1 | 12/2010 | Asaka |
| 2011/0004753 A1 | 1/2011 | Gomi et al. |
| 2011/0010538 A1 | 1/2011 | Falk et al. |
| 2011/0035593 A1 | 2/2011 | Pyle et al. |
| 2011/0055562 A1 | 3/2011 | Adelman et al. |
| 2011/0055585 A1 | 3/2011 | Lee |
| 2011/0078107 A1 | 3/2011 | Almeida et al. |
| 2011/0083015 A1 | 4/2011 | Meier |
| 2011/0099362 A1 | 4/2011 | Haga et al. |
| 2011/0125894 A1 | 5/2011 | Anderson et al. |
| 2011/0131415 A1 | 6/2011 | Schneider |
| 2011/0138192 A1 | 6/2011 | Kocher et al. |
| 2011/0167479 A1 | 7/2011 | Maes |
| 2011/0179469 A1 | 7/2011 | Blinn et al. |
| 2011/0231317 A1 | 9/2011 | Arsac |
| 2011/0231940 A1 | 9/2011 | Perumal et al. |
| 2011/0239283 A1 | 9/2011 | Chern |
| 2011/0252229 A1 | 10/2011 | Belenkiy et al. |
| 2011/0265172 A1 | 10/2011 | Sharma et al. |
| 2011/0296497 A1 | 12/2011 | Becker |
| 2011/0311055 A1 | 12/2011 | Parann-Nissany |
| 2011/0320606 A1 | 12/2011 | Madduri et al. |
| 2012/0017095 A1 | 1/2012 | Blenkhorn et al. |
| 2012/0020474 A1 | 1/2012 | Kudoh et al. |
| 2012/0023334 A1 | 1/2012 | Brickell et al. |
| 2012/0036551 A1 | 2/2012 | Le Saint et al. |
| 2012/0054625 A1 | 3/2012 | Pugh et al. |
| 2012/0060035 A1 | 3/2012 | Kalmady et al. |
| 2012/0106735 A1 | 5/2012 | Fukuda |
| 2012/0110636 A1 | 5/2012 | Van Biljon et al. |
| 2012/0144034 A1 | 6/2012 | McCarty |
| 2012/0144459 A1 | 6/2012 | Nguyen et al. |
| 2012/0159577 A1 | 6/2012 | Belinkiy et al. |
| 2012/0233216 A1 | 9/2012 | Lim |
| 2012/0243687 A1 | 9/2012 | Li et al. |
| 2012/0245978 A1 | 9/2012 | Jain et al. |
| 2012/0265690 A1 | 10/2012 | Bishop et al. |
| 2012/0317414 A1 | 12/2012 | Glover |
| 2013/0031255 A1 | 1/2013 | Maloy et al. |
| 2013/0086662 A1 | 4/2013 | Roth |
| 2013/0086663 A1 | 4/2013 | Roth et al. |
| 2013/0111217 A1 | 5/2013 | Kopasz et al. |
| 2013/0132232 A1 | 5/2013 | Pestoni et al. |
| 2013/0145447 A1 | 6/2013 | Maron |
| 2013/0166918 A1 | 6/2013 | Shahbazi et al. |
| 2013/0191884 A1 | 7/2013 | Leicher et al. |
| 2013/0198519 A1 | 8/2013 | Marien |
| 2013/0254536 A1 | 9/2013 | Glover |
| 2013/0282461 A1 | 10/2013 | Ovick et al. |
| 2013/0318630 A1 | 11/2013 | Lam |
| 2014/0013409 A1 | 1/2014 | Halageri |
| 2014/0020051 A1 | 1/2014 | Lu et al. |
| 2014/0082715 A1 | 3/2014 | Grajek et al. |
| 2014/0122866 A1 | 5/2014 | Haeger et al. |
| 2014/0181925 A1 | 6/2014 | Smith |
| 2014/0208408 A1 | 7/2014 | Bilgen et al. |
| 2014/0281477 A1 | 9/2014 | Nayshtut et al. |
| 2014/0281487 A1 | 9/2014 | Klausen et al. |
| 2015/0082039 A1 | 3/2015 | Stalzer et al. |
| 2015/0089614 A1 | 3/2015 | Mathew et al. |

FOREIGN PATENT DOCUMENTS

| | | |
|---|---|---|
| WO | WO2010128358 | 11/2010 |
| WO | WO2014063361 | 5/2014 |

OTHER PUBLICATIONS

Berners-Lee et al., "Uniform Resource Identifier (URI): Generic Syntax," Network Working Group Request for Comments: 3986, The Internet Society 2005, retrieved on Nov. 30, 2011, from http://www.ietf.org/rfc/rfc3986.txt.

Ghorbei-Talbi et al., "Managing Delegation in Access Control Models," International Conference on Advanced Computing and Communications, pp. 744-751, Dec. 18-21, 2007.

International Search Report and Written Opinion dated Dec. 30, 2014, in International Patent Application No. PCT/US2014/057043, filed Sep. 23, 2014.

International Search Report and Written Opinion dated Dec. 30, 2014, in International Patent Application No. PCT/US2014/057051, filed Sep. 23, 2014.

International Search Report and Written Opinion dated Oct. 22, 2014, International Patent Application No. PCT/US2014/042569, filed Jun. 16, 2014.

Krawczyk et al., "HMAC: Keyed-Hashing for Message Authentication," Internet Engineering Task Force (IETF) Request for Comments: 2104, Feb. 1997, retrieved Jan. 22, 2015, from https://tols.ietf.org/html/rfc2104, pp. 1-11.

Liscano et al., "A Context-based Delegation Access Control Model for Pervasive Computing," 21st International Conference on Advanced Information Networking and Applications Workshops 2:44-51, May 21-23, 2007.

Massachusetts Institute of Technology, "Kerberos V5 Installation Guide [online]," May 2012, retrieved on Jun. 27, 2012, from http://web.mit.edu/kerberos/krb5-1.10/krb5-1.10.2/doc/krb5-install.htm, 65 pages.

Massachusetts Institute of Technology, "Kerberos V5 System Administrator's Guide [online]," May 2012, retrieved on Jun. 27, 2012, from http://web.mit.edu/kerberos/krb5-1.10/krb5-1.10.2/doc/krb5-admin.html, 57 pages.

Massachusetts Institute of Technology, "Kerberos V5 UNIX User's Guide," May 2012, retrieved on Jun. 28, 2012, from http://web.mit.edu/kerberos/krb5-1.10/krb5-1.10.2/doc/krb5-user.html, 38 pages.

Patent Cooperation Treaty, "Notification of Transmittal of the International Search Report and the Written Opinion of the International Searching Authority, or the Declaration," issued to International Application No. PCT/US2012/058083 dated Dec. 27, 2012.

Roth et al., "Hierarchical Data Access Techniques," U.S. Appl. No. 13/431,882, filed Mar. 27, 2012.

(56) References Cited

OTHER PUBLICATIONS

Simpson, "PPP Challenge Handshake Authentication Protocol (CHAP)," Network Working Group, Aug. 1996, retrieved from internet Jun. 27, 2012, http://etherpad.tools.ietf.org/html/rfc1994, 13 pages.
TCG Published, "TPM Main Part 1 Design Principles," Specification Version 1.2, Revision 116, Mar. 1, 2011, 184 pages.
TCG Published, "TPM Main Part 2 TPM Structures," Specification Version 1.2, Level 2 Revision 116, Mar. 1, 2011, 202 pages.
TCG Published, "TPM Main Part 3 Commands," Specification Version 1.2, Level 2 Revision 116, Mar. 1, 2011, 339 pages.
U.S. Appl. No. 13/431,760, filed Mar. 27, 2012.
U.S. Appl. No. 13/431,898, filed Mar. 27, 2012.
U.S. Appl. No. 14/634,513, filed Feb. 27, 2015.
Wang et al., "Extending the Security Assertion Markup Language to Support Delegation for Web Services and Grid Services," IEEE International Conference on Web Services 1:67-74, Jul. 11-15, 2005.
Wikipedia, "Physical unclonable function," retrieved Aug. 22, 2013, from http://en.wikipedia.org/wiki/Physical_unclonable_function, 8 pages.
Gomi; "Access Control Model and Design for Delegation Using Authorization Tokens," Third International Conference on Privacy, Security, Risk and Trust and Third International Conference on Social Computing, IEEE, Oct. 9-11, 2011, pp. 1239-1242.

\* cited by examiner

DISTRIBUTED POLICY ENFORCEMENT WITH OPTIMIZING POLICY TRANSFORMATIONS

CROSS-REFERENCE TO RELATED APPLICATIONS

This application claims priority to and is a continuation of U.S. patent application Ser. No. 14/992,964, filed Jan. 11, 2016, entitled "DISTRIBUTED POLICY ENFORCEMENT WITH OPTIMIZING POLICY TRANSFORMATIONS" which is a continuation of U.S. patent application Ser. No. 12/961,104, filed Dec. 6, 2010, now U.S. Pat. No. 9,237,155, entitled "DISTRIBUTED POLICY ENFORCEMENT WITH OPTIMIZING TRANSFORMATIONS," the content of which are incorporated by reference herein in their entirety

BACKGROUND

Modern computing networks provide access to a wide variety of computing resources such as data archives, search engines, data processing, data management, communications, electronic marketplaces, as well as media and entertainment services. As the number and size of such computing resources, and their user communities, have grown and become more sophisticated, a need has arisen to establish increasingly sophisticated usage policies. For example, such policies may include policies that address security, privacy, access, regulatory and cost concerns. However, conventional approaches to policy enforcement have drawbacks.

For example, conventional approaches to policy enforcement can be ad hoc, limited to a particular type of computing resource and/or limited to a particular set of policy controls. In heterogeneous computing environments incorporating even a modest number of computing resource types, an ad hoc approach can be a significant administrative burden. In addition, some conventional approaches scale poorly as the number of computing resources grows large. Small administrative and/or performance inefficiencies can become problematic at larger scales. Some conventional approaches lack a centralized policy management service which can hamper consistent policy management in distributed computing environments. Some conventional approaches are limited to centralized policy management, which can be insufficiently flexible in response to changing requirements.

Policy set complexity can also be a problem for some conventional approaches to policy enforcement. For example, policy administrators may have difficulty implementing a desired policy in practice, even when it is possible in theory. Policies may be inconsistently enforced by different computing resource types. The specification of a particular policy may have unanticipated and/or unintended consequences. Furthermore, it is becoming increasingly common to provision such computing resources with virtual computing resource providers. In such cases, computing resource administrators may not have control over, or direct access to, computing hardware or other infrastructure that implements the provisioned computing resources. In some conventional approaches to policy enforcement, such environments can hinder acquisition of sufficient diagnostic information to efficiently resolve policy enforcement problems.

BRIEF DESCRIPTION OF THE DRAWINGS

Various embodiments in accordance with the present disclosure will be described with reference to the drawings, in which.

Same numbers are used throughout the disclosure and figures to reference like components and features, but such repetition of number is for purposes of simplicity of explanation and understanding, and should not be viewed as a limitation on the various embodiments.

DETAILED DESCRIPTION

Figure 1:
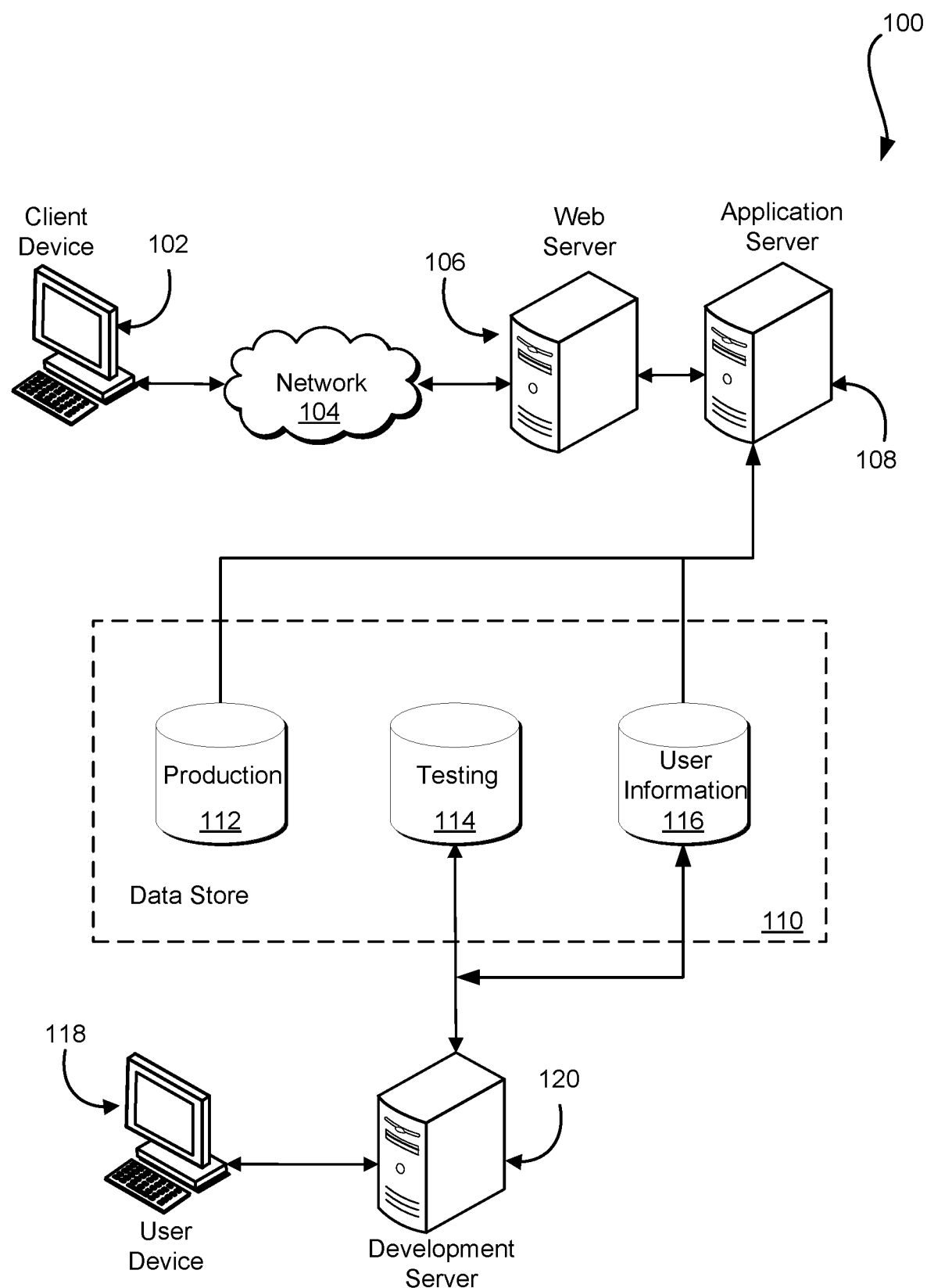
FIG. 1 is a schematic diagram illustrating an example environment for implementing aspects in accordance with at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Policies may be specified with a convenient policy specification language and/or user interface. However, such user-specified policies may be inefficient for the purposes of policy enforcement, particularly as the set of user-specified policies grows large. In at least one embodiment, user-specified policies may be transformed and/or processed into a normal policy form ("normal form"). The normal form may include a defined set of policy elements, each with a defined set of possible values. For example, the set of policy elements may include an "actions" element corresponding to a set of actions governed by the policy, a "principals" element corresponding to a set of principals or actors with respect to the set of actions, a "resources" element corresponding to a set of resources or subjects of the action, and/or a "conditions" element corresponding to a set of conditions to be satisfied before the policy is enforced.

The set of normal form policies may be efficiently optimized, for example, optimized for efficient indexing and/or optimized with respect to set size. Normal form policies may be split and/or joined with respect to policy elements, and duplicates efficiently removed. Normal form policies may be efficiently indexed with respect to policy element values and/or particular subsets of policy element values. For example, when the set of normal form policies are to be enforced with respect to a variety of computing resources, the set may be indexed by computing resource, computing resource type, computing resource server, and suitable combinations thereof. Subsets of the set of normal form policies may be distributed to multiple policy enforcement components based on the indexing and/or based on a relevance of particular policy subsets to particular policy enforcement components.

A virtual resource provider capable of provisioning a variety of virtual computing resources may include a centralized policy management service that maintains the set of normalized policies and distributes appropriate subsets to multiple policy enforcement components distributed throughout the virtual resource provider. Alternatively, or in addition, normal form policies may be maintained local to particular policy enforcement components and/or associated virtual computing resource implementation services. As a further alternative, policies may be provided along with action requests. In each case, a policy may be compatible with the normal form, and be associated with and/or accompanied by cryptographic credentials that authenticate and/or authorize the policy and/or an associated user. For example, the user may be authorized to set policies with respect to a particular set of computing resources. Such policies themselves are an example of a computing resource that may be subject to policy control.

Requests with respect to resources may be submitted to one or more policy enforcement components. For example, a request may be submitted to one or more policy enforcement components locally maintaining one or more policies that are relevant to the request. A distributed policy enforcement system with multiple policy enforcement components may have a "sandbox" mode and/or verification mode for processing requests. An authorized user may activate the verification mode with an indicator incorporated into an service interface, with an explicit verification mode service interface, and/or with a cryptographic verification mode token, the acquisition of which is subject to policy control. During the verification mode, requests may be evaluated with respect to policies as usual while requested actions are inhibited.

Such evaluations may depend on a set of decision data including user identity, a user's group memberships, protocol level details such as network source address of the request and protocol utilized to transmit the request, geographic regions associated with the request such as source geographic location of the request, regulatory classifications associated with the request, date and time. Authorized users may substitute pieces of decision data with specified values, for example, to enable an administrator to verify that a particular set of policies will govern the actions of a particular user or group of users as intended, and/or to diagnose problems. In verification mode, evaluation results, relevant policies, and decision data utilized during request evaluation may be collected, filtered and reported at a variety of levels of detail. The reported set of relevant policies may include normal form policies utilized to evaluate a request and/or a corresponding set of user-specified policies. Originating user-specified policies may be tracked during the policy normalization process to enable reporting of user-specified policies in verification mode. The reported set of decision data may include decision data not otherwise accessible to the report recipient.

Various approaches may be implemented in various environments for various applications. For example, FIG. 1 illustrates aspects of an environment 100 for implementing aspects in accordance with various embodiments. As will be appreciated, although a web-based environment may be utilized for purposes of explanation, different environments may be utilized, as appropriate, to implement various embodiments. The environment 100 shown includes both a testing or a development portion (or side) and a production portion. The production portion includes a client device 102, which may include any appropriate electronic device operable to send and receive requests, messages, or information over an appropriate network 104 and convey information back to a user of the client device 102. Examples of such client devices include personal computers, cell phones, smartphones, handheld messaging devices, laptop computers, tablet computers, set-top boxes, personal data assistants, electronic book readers, and the like.

The network 104 may include any appropriate network, including an intranet, the Internet, a cellular network, a local area network, a wide area network, a wireless data network, or any other such network or combination thereof. Components utilized for such a system may depend at least in part upon the type of network and/or environment selected. Protocols and components for communicating via such a network are well known and will not be discussed herein in detail. Communication over the network may be enabled by wired or wireless connections, and combinations thereof. In this example, the network 104 includes the Internet, as the environment includes a web server 106 for receiving requests and serving content in response thereto, although for other networks an alternative device serving a similar purpose could be utilized as would be apparent to one of ordinary skill in the art.

The environment 100 includes at least one application server 108 and a data store 110. It should be understood that there may be several application servers, layers, or other elements, processes, or components, which may be chained or otherwise configured, which may interact to perform tasks such as obtaining data from an appropriate data store. As used herein the term "data store" refers to any device or combination of devices capable of storing, accessing, and/or retrieving data, which may include any combination and number of data servers, databases, data storage devices, and data storage media, in any standard, distributed, or clustered environment.

The application server 108 may include any appropriate hardware and software for integrating with the data store as needed to execute aspects of one or more applications for the client device 102, and may even handle a majority of the data access and business logic for an application. The application server 108 provides access control services in cooperation with the data store 110, and is able to generate content such as text, graphics, audio, and/or video to be transferred to the user, which may be served to the user by the web server 106 in the form of HTML, XML, or another appropriate structured language in this example.

The handling of all requests and responses, as well as the delivery of content between the client device 102 and the application server 108, may be handled by the web server 106. It should be understood that the web and application servers 106 and 108 are not required and are merely example components, as structured code discussed herein may be executed on any appropriate device or host machine as discussed elsewhere herein. Further, the environment 100 may be architected in such a way that a test automation framework may be provided as a service to which a user or application may subscribe. A test automation framework may be provided as an implementation of any of the various testing patterns discussed herein, although various other implementations may be utilized as well, as discussed or suggested herein.

The environment 100 may also include a development and/or testing side, which includes a user device 118 allowing a user such as a developer, data administrator, or tester to access the system. The user device 118 may be any appropriate device or machine, such as is described above with respect to the client device 102. The environment 100 may also include a development server 120, which functions similar to the application server 108 but typically runs code during development and testing before the code is deployed and executed on the production side and becomes accessible to outside users, for example. In some embodiments, an application server may function as a development server, and separate production and testing storage may not be utilized.

The data store 110 may include several separate data tables, databases, or other data storage mechanisms and media for storing data relating to a particular aspect. For example, the data store 110 illustrated includes mechanisms for storing production data 112 and user information 116, which may be utilized to serve content for the production side. The data store 110 also is shown to include a mechanism for storing testing data 114, which may be utilized with the user information for the testing side. It should be understood that there may be many other aspects that are stored in the data store 110, such as for page image information and access right information, which may be stored in any of the above listed mechanisms as appropriate or in additional mechanisms in the data store 110.

The data store 110 is operable, through logic associated therewith, to receive instructions from the application server 108 or development server 120, and obtain, update, or otherwise process data in response thereto. In one example, a user might submit a search request for a certain type of item. In this case, the data store 110 might access the user information 116 to verify the identity of the user, and may access the catalog detail information to obtain information about items of that type. The information then may be returned to the user, such as in a results listing on a web page that the user is able to view via a browser on the client device 102. Information for a particular item of interest may be viewed in a dedicated page or window of the browser.

Each server typically will include an operating system that provides executable program instructions for the general administration and operation of that server, and typically will include a computer-readable medium storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment 100 in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 1. Thus, the depiction of the environment 100 in FIG. 1 should be taken as being illustrative in nature, and not limiting to the scope of the disclosure.

Figure 2:
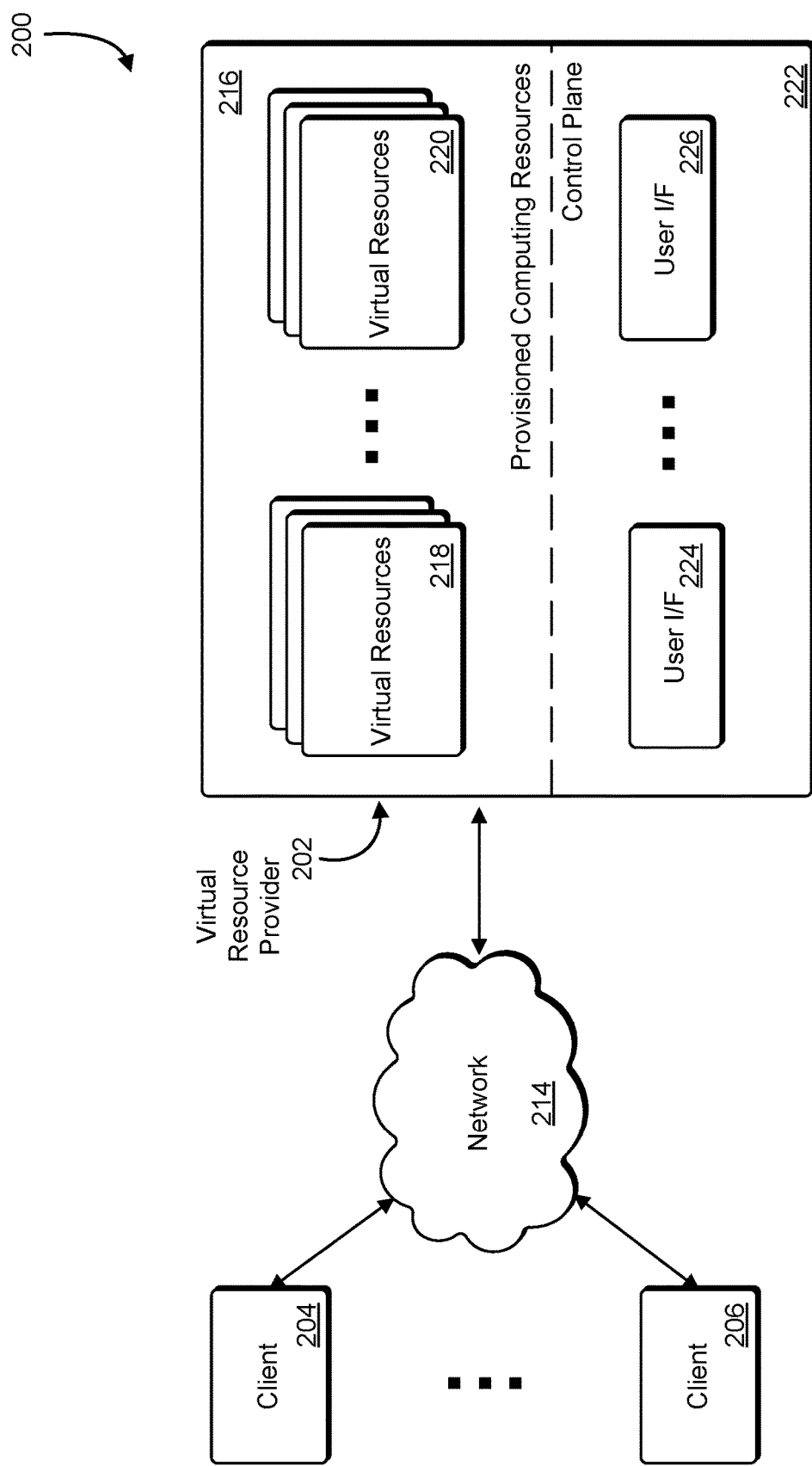
FIG. 2 is a schematic diagram depicting aspects of an example virtual computing resources architecture in accordance with at least one embodiment.

In at least one embodiment, one or more aspects of the environment 100 may incorporate and/or be incorporated into a virtual computing resources architecture. FIG. 2 depicts aspects of an example virtual computing resources architecture 200 in accordance with at least one embodiment. The example virtual computing resources architecture 200 includes a virtual resource provider 202 enabling various clients 204-206 to interact with provisioned computing resources 216 over a network 214. The provisioned computing resources 216 may include multiple types of virtual resource 218-220 such as virtual computing systems and clusters, virtual file system volumes, virtual private networks, data object stores, notification services, and suitable combinations thereof. The ellipsis between the types of virtual resource 218 and 220 indicates that the virtual resource provider 202 may maintain any suitable number of such computing resource types and/or instances. Ellipses are used similarly throughout the drawings.

Figure 3:
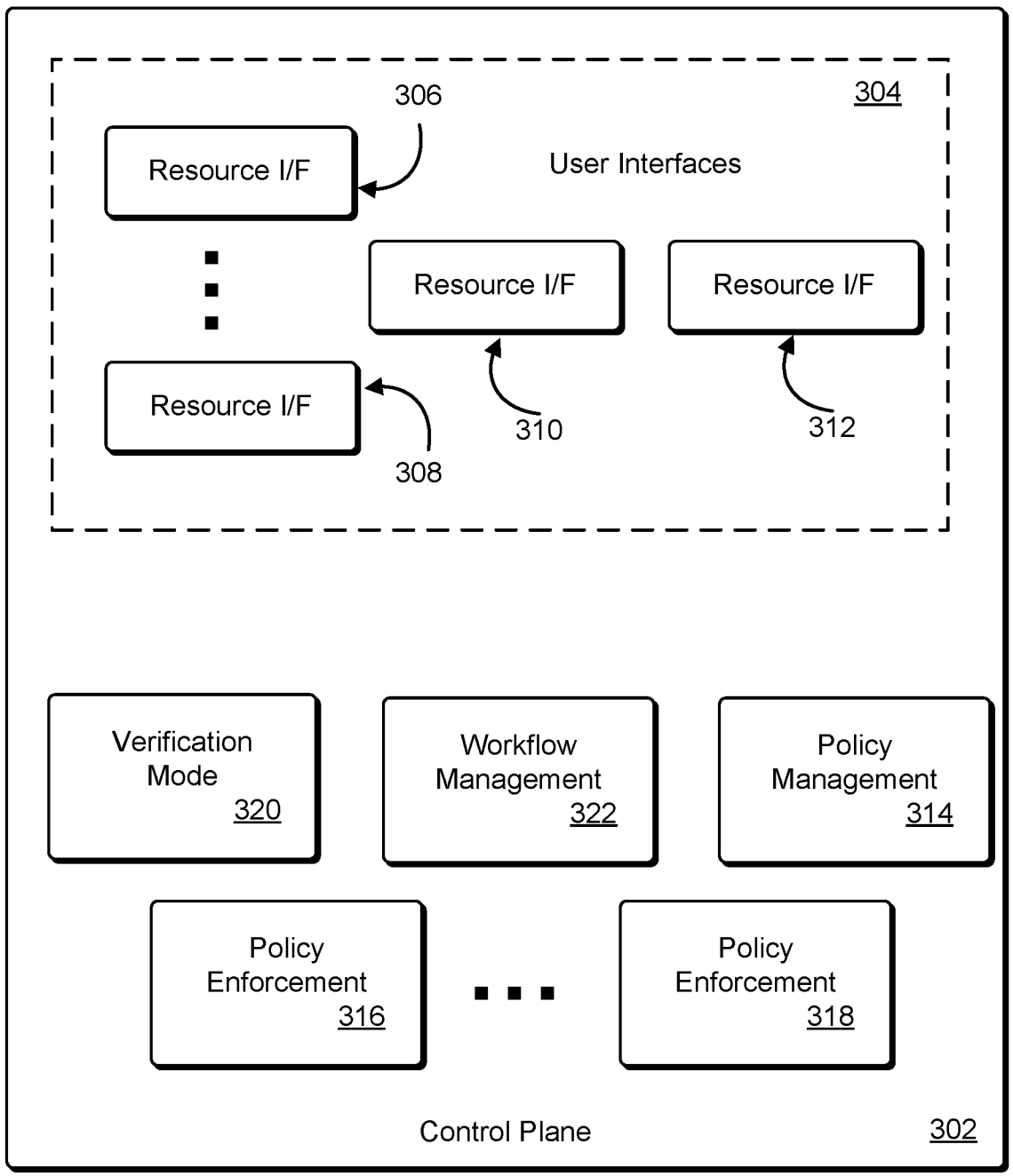
FIG. 3 is a schematic diagram depicting aspects of an example virtual resource provider control plane in accordance with at least one embodiment.

The virtual resource provider 202 may be implemented, at least in part, with server computers such as the web server 106 and the application server 108 described above with reference to FIG. 1, and one or more data stores such as the data store 110 of FIG. 1, interconnected by a relatively high speed data network (not shown in FIG. 2). The server computers and/or data store(s) implementing the virtual resource provider 202 may include different types and/or configurations of server computers and/or data stores allocated to different virtual resource types 218-220 and to a control plane 222 of the virtual resource provider 202. The control plane 222 may include multiple user interfaces 224-226 that enable the clients 204-206 to interact with the virtual resource provider 202, including provisioning and interacting with the virtual resources 218-220, as well as setting policies with respect to the virtual resources 218-220. FIG. 3 depicts further aspects of a control plane 302 in accordance with at least one embodiment.

The user interfaces 304 of the control plane 302 may include any suitable type of user interface. For example, the user interface 304 may include graphical user interfaces (GUIs), web-based interfaces, programmatic interfaces such as application programming interfaces (APIs) and/or sets of remote procedure calls (RPCs) corresponding to interface elements, messaging interfaces in which the interface elements correspond to messages of a communication protocol, and/or suitable combinations thereof. The user interfaces 304 may include multiple resource interfaces 306-308 enabling user interaction with the virtual resources 218-220 (FIG. 2). For example, there may be one of the resource interfaces 306-308 for each of the types of virtual resource 218-220. As another example, one or more of the resource interfaces 306-308 may enable interaction with multiple virtual resource types 218-220. Alternatively, or in addition, one or more of the types of virtual resource 218-220 may incorporate interfaces enabling direct interaction (e.g., by the clients 204-206) without mediation by one of the user interfaces 304.

The user interfaces 304 may further include a provisioning interface 310 enabling authorized users to provision, configure, re-configure and/or de-provision (collectively, "provision") the virtual resources 218-220 (FIG. 2). Although the control plane 302 example includes one such provisioning interface 310, embodiments may include any suitable number of such provisioning interfaces, including a provisioning interface for each type of virtual resource 218-220. Alternatively, or in addition, the resource interface 306 corresponding to a particular type of virtual resource 218 may incorporate the provisioning interface for that virtual resource 218 type. The user interfaces 304 of the control plane 302 may still further include a policy management interface 312 enabling establishment, viewing, editing and/or deletion (collectively, "maintenance") of virtual resource provider 202 policies including policies with respect to the virtual resources 218-220 and with respect to policy management. Again, although the control plane 302 example includes one such policy management interface 312, embodiments may include any suitable number of policy management interfaces including a policy management interface for each type of virtual resource 218-220. The resource interface 306 corresponding to a particular type of virtual resource 218 may incorporate the policy management interface for that virtual resource 218 type.

The control plane 302 may include a policy management component 314 configured at least to provide centralized policy management for the virtual resource provider 202 (FIG. 2). The policy management component 314 may receive user-specified policies, for example, specified with the policy management interface 312, and transform user-specified policies into a normal form. The policy management component 314 may then optimize the set of normal form policies, for example, for indexing and/or with respect to set size, and index the set of normal form policies based at least in part on one or more policy elements of the normal form. The policy management component 314 may then distribute the optimized normal form policies to a set of policy enforcement components 316-318 in a manner based at least in part on the index.

The control plane 302 may further include a verification mode component 320 configured at least to facilitate verification mode reporting. The verification mode component 320 may collect request evaluation results, normal form policies and/or decision data, map normal form policies to user-specified policies, and generate reports at specified levels of detail. For example, verification mode report detail levels may include a low detail level corresponding to an evaluation result and basic contextual information, a medium detail level that adds a set of policies considered to determine the evaluation result, a high detail level that further adds a set of decision data considered to determine the evaluation result, and a very high detail level that further adds virtual resource provider 202 (FIG. 2) operational information that may assist anomalous behavior diagnosis (e.g., debugging). For example, such operational information may include an identification of the set of policy enforcement components 316-318 involved in evaluating a request associated with the report. In at least one embodiment, verification mode may be a mechanism by which authorized users are permitted access to such virtual resource provider 202 operation information. Verification mode may correspond to a sandbox mode in the software development and/or testing sense, enabling configuration verification and/or testing without possible high cost consequences (e.g., in terms of financial and/or resource costs).

The verification mode component 320 may be further configured to process requests for verification mode tokens (e.g., cryptographic tokens), and to authenticate such tokens. For example, a verification mode token may be submitted with a request in order to indicate that the request is to be processed in verification mode. Alternatively, or in addition, verification mode tokens may authorize substitution of decision data (or at least a portion of the decision data) utilized when evaluating a request with respect to a set of policies. For example, the verification mode token may authorize substitution of decision data related to user identity, thus enabling an administrator to verify that a particular policy set has an intended effect with respect to a particular user.

The control plane 302 may include a workflow management component 322 configured at least to establish and maintain workflows such as resource workflows, provisioning workflows and/or policy management workflows established responsive to user interaction with the resource interfaces 306-308, the provisioning interface 310, and/or the policy management interface 312, respectively. Workflows may include one or more sequences of tasks to be executed to perform a job, such as virtual resource configuration, provisioning or policy management. A workflow, as the term is used herein, is not the tasks themselves, but a task control structure that may control flow of information to and from tasks, as well as the order of execution of the tasks it controls. For example, a workflow may be considered a state machine that can manage and return the state of a process at any time during execution. Workflows may be created from workflow templates. For example, a policy management workflow may be created from a policy management workflow template configured with parameters by the policy management component 314.

The workflow management component 322 may modify, further specify and/or further configure established workflows. For example, the workflow management component 322 may select particular implementation resources of the virtual resource provider 202 to execute and/or be assigned to particular tasks. Such selection may be based at least in part on the computing resource needs of the particular task as assessed by the workflow management component 322. As another example, the workflow management component 322 may add additional and/or duplicate tasks to an established workflow and/or reconfigure information flow between tasks in the established workflow. Such modification of established workflows may be based at least in part on an execution efficiency analysis by the workflow management component 322. For example, some tasks may be efficiently performed in parallel, while other tasks depend on the successful completion of previous tasks.

Figure 4:
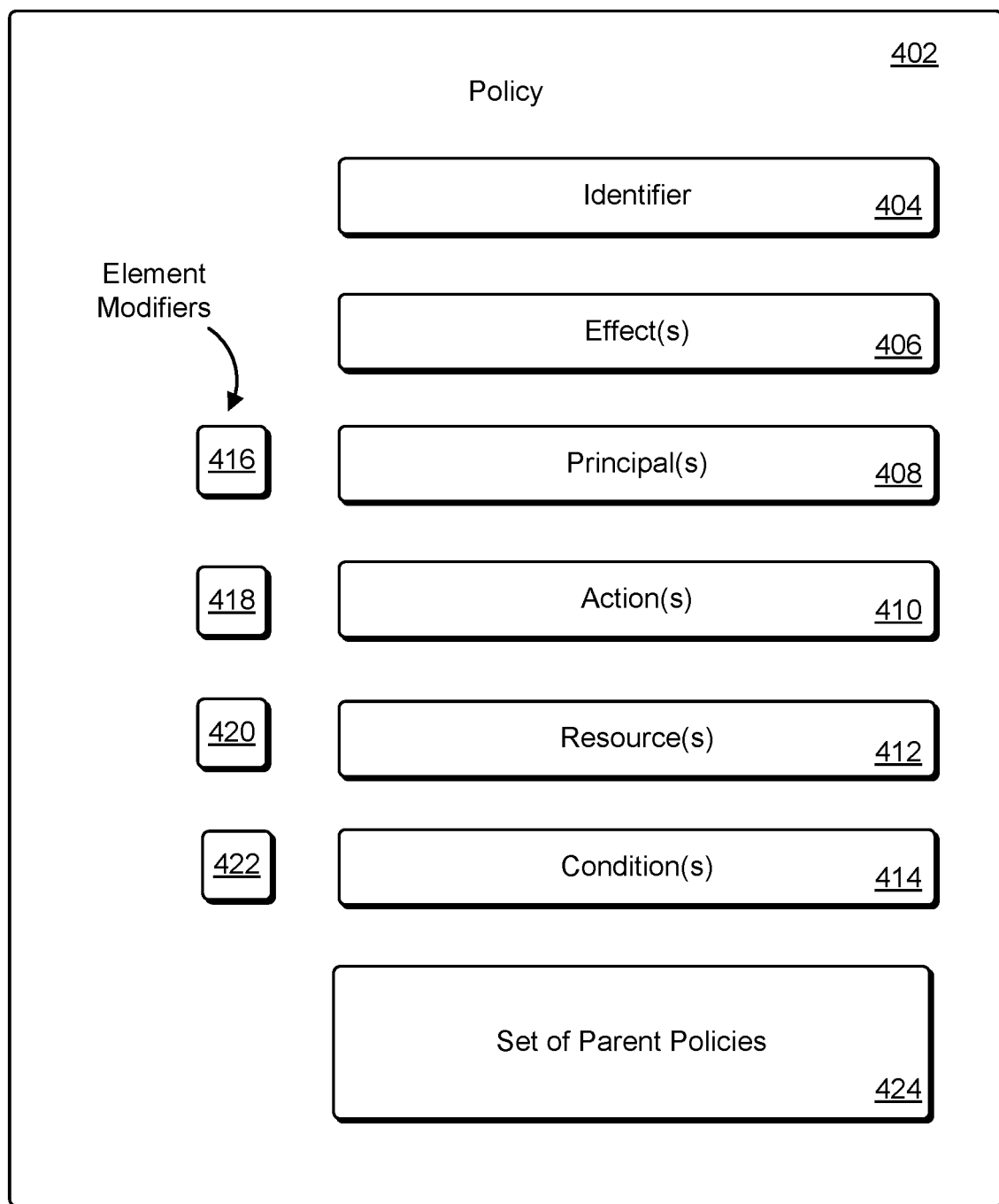
FIG. 4 is a schematic diagram depicting aspects of an example normal form policy in accordance with at least one embodiment.

The normal form of a policy may include a defined set of policy elements. FIG. 4 depicts aspects of an example normal form policy 402 in accordance with at least one embodiment. The policy 402 includes a policy identifier 404 uniquely identifying the policy 402, one or more effects 406 of the policy 402, reference to one or more principals 408 or actors governed by the policy, a specification of one or more actions 410 governed by the policy 402, reference to one or more resources 412 governed by the policy 402, a specification of one or more conditions 414 to be satisfied before the policy 402 is enforced, and a set of element modifiers 416, 418, 420, 422 corresponding to the policy elements 408, 410, 412, 414, respectively. The policy 402 may have an alphanumeric and/or Unicode representation and/or encoding sometimes called the policy document.

The policy identifier 404 may be any suitable identifier uniquely identifying the policy 402. For example, the policy identifier 404 may correspond to an alphanumeric and/or Unicode (collectively, "alphanumeric") string or integer number. The policy identifier 404 may be utilized to reference the policy 402. Examples of policy effects include permit and deny. The effect(s) 406 element of the policy 402 may specify such policy effects. For example, a particular policy may permit one or more principals 408 to take one or more actions 410 with respect to one or more resources 412, while another policy may deny a set of actions 410 to a set of principals 408.

The principal(s) 408 element of the policy 402 may specify one or more entities known to the virtual resource provider 202 (FIG. 2) that are capable of making requests of the virtual resource provider 202. Such entities may include users having a user account with the virtual resource provider 202, customers having a commercial account (e.g., a cost-tracking account) with the virtual resource provider 202, and groups of users and/or customers including role-based groups such as administrators. Such entities may be specified with any suitable identifier including user identifiers, customer account numbers, group identifiers, and alphanumeric strings.

The action(s) 410 element of the policy 402 may specify one or more actions capable of being performed by the virtual resource provider 202 (FIG. 2). Such actions may include actions capable of being performed by the virtual resources 218-220 of the virtual resource provider 202 and/or actions that may be requested with the user interfaces 224-226 of the virtual resource provider 202, including policy management actions. In at least one embodiment, actions specified by the action(s) 410 element correspond to elements of the user interfaces 224-226. Such actions may be specified with any suitable action identifier including interface element identifiers and alphanumeric strings.

The resource(s) 412 element of the policy 402 may specify one or more resources of the virtual resource provider 202 (FIG. 2) for which one or more of the action(s) 410 is valid. Such resources may include virtual resources 218-220, implementation resources, policies, and verification mode tokens. Such resources may be specified with any suitable resource identifier including resource identifiers in accordance with a uniform resource identifier (URI) standard such as Berners-Lee et al., "Uniform Resource Identifier (URI): Generic Syntax," Request for Comments (RFC) 3986, Network Working Group, January 2005.

The condition(s) 414 element of the policy 402 may specify a set of conditions to be satisfied before the policy 402 is enforced. For example, the condition(s) 414 may specify the conditions under which the principal(s) 408 are permitted to perform the action(s) 410 with respect to the resource(s) 412. Such conditions may be specified with any suitable condition specification language including suitable programming languages, and may include compound conditions, for example, specified with Boolean operators. Condition parameters may include any suitable data available to the virtual resource provider 202 (FIG. 2). Condition parameter examples include environmental data such as calendar date and time of day, and request-associated data such as originating network address, originating geographical location, originating political and/or administrative division and communication protocol employed.

By default, the policy 402 effect(s) 406 may be enforced when the specified principal(s) 408 request the specified action(s) 410 with respect to the specified resource(s) 412 and the specified set of condition(s) 414 are satisfied. However, the element modifiers 416-422 may indicate that the corresponding policy elements 408-414 specify exceptions. That is, that the policy 402 effect(s) 406 be enforced unless the specified principal(s) 408 are the actors, unless the specified action(s) 410 are requested, unless the specified resource(s) 412 are the subject of action and/or unless the specified set of conditions is satisfied. In addition, policy element 408-414 specifications may include "wildcard" values. For example, a wildcard value may match all and/or any valid values of the policy element 408-414. Alternatively, or in addition, wildcard values may be matched contextually. For example, a wildcard value may match all and/or any values of the policy element 408-414 that are valid with respect to a particular user, customer, group, and/or other context of a particular request.

As described above with reference to FIG. 3, the policy management component 314 may transform user-specified policies into normal form policies, and optimize sets of normal form policies. The optimized set of normal form policies may differ significantly from the supplied set of user-specified policies. A single user-specified policy can result in the addition of multiple normal form policies. A single normal form policy can participate in enforcing multiple user-specified policies. In at least one embodiment, each normal form policy 402 maintains a set of references to "parent" policies 424 which the normal form policy 402 participates in enforcing. For example, the set of parent policies 424 may be updated during user-specified policy transformation and normal form policy set optimization operations.

Figure 5:
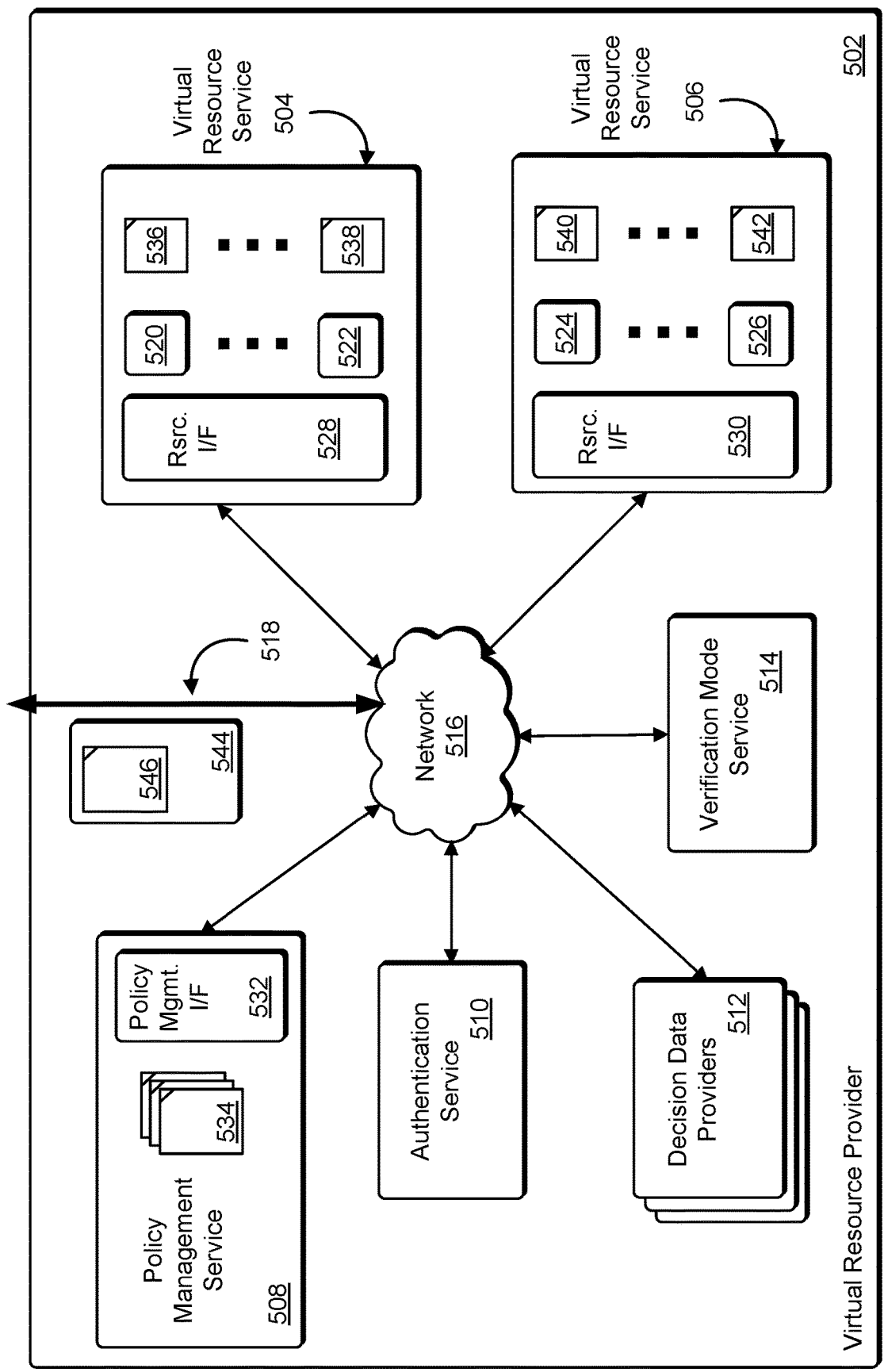
FIG. 5 is a schematic diagram depicting aspects of an example virtual resource provider in accordance with at least one embodiment.

The virtual resource provider 202 may be implemented as a collection of networked services. FIG. 5 depicts aspects of an example virtual resource provider 502 implemented in accordance with at least one embodiment. The virtual resource provider 502 includes multiple virtual resource services 504-506, a policy management service 508, an authentication service 510, a set of decision data providers 512, and a verification mode service 514, each interconnected by a network 516. The arrow 518 indicates that the network 516 is connected to the network 214 of FIG. 2.

Each virtual resource service 504, 506 may maintain a set of provisioned resources 520-522, 524-526 and incorporate a resource interface 528, 530. For example, each virtual resource service 504-506 may maintain one type of virtual resource 218-220 as described above with reference to FIG. 2, and incorporate a corresponding one of the resource interfaces 306-308 described above with reference to FIG. 3. The policy management service 508 may incorporate a policy management interface 532 corresponding to the policy management interface 312 of FIG. 3.

The policy management service 508 may act as a centralized policy management service for the virtual resource provider 502, managing, transforming, optimizing and distributing one or more sets of policies 534 to other services 504-506, 510-514 of the virtual resource provider 502. In addition, in at least one embodiment, services 504-506, 510-514 of the virtual resource provider 502 other than the policy management service 508 may maintain policies. For example, the virtual resource services 504-506 may each maintain a set of policies 536-538, 540-542 that are relevant to the respective set of provisioned resources 520-522, 524-526. Such policies 536-538, 540-542 may be established, viewed, edited and deleted with policy management interface 312 (FIG. 3) functionality integrated into the associated resource interface 528-530. Such policies 536-

538, 540-542 may be compatible with the policies 534 maintained by the policy management service 508. For example, the policies 536-538, 540-542 may each have a form corresponding to the normal form policy 402 (FIG. 4). Further in addition, in at least one embodiment, policies may be maintained at a location external to the virtual resource provider 502, and supplied for enforcement as part of interactions with the services 504-514 of the virtual resource provider 502. For example, request 544 incorporates such a policy 546.

The authentication service 510 may provide authentication services for the virtual resource provider 502. For example, the authentication service 510 may authenticate an integrity and/or an authenticity of policies 534-542, 546. In addition, the authentication service 510 may authenticate an identity of clients 204-206 (FIG. 2), customers and/or users of the virtual resource provider 502. For example, the policy management interface 532 and/or the resource interfaces 528-530 may utilize the authentication service 510 to establish and/or verify an identify and/or authority of a user with respect to policies 534-542, 546 and/or provisioned resources 520-526. The authentication service 510 may utilize any suitable authentication mechanism, including any suitable cryptographic authentication mechanism, to provide the authentication services. Such authentication mechanisms are well known in the art and need not be detailed here.

The decision data providers 512 may provide data required by policy enforcement components 316-318 (FIG. 3) to evaluate requests that are subject to policies. For example, the provisioned resources 520-526 may be associated with various labeling and/or naming schemes ("resource names"), and the decision data providers 512 may include a name resolution provider that maps or resolves such resource names to locations (e.g., network locations) within the virtual resource provider 502. The decision data providers 512 may further include providers of data required to determine whether the condition(s) 414 (FIG. 4) of the policy 402 are satisfied. For example, a particular policy may deny interaction with a particular resource from a specified set of geographic locations and/or regions (collectively, "geographic locations"). In such a case, the decision data providers 512 may include a geographic resolution provider capable of identifying a set of geographic locations associated with the request 544.

The verification mode service 514 may provide verification mode functionality (e.g., as described above with reference to the verification mode component 320 of FIG. 3) as a service to the other services 504-512 of the virtual resource provider 502. For example, the resource interfaces 528-530 and/or the policy management interface 532 may query the verification mode service 514 to authenticate a verification mode token and/or may provide evaluation results for reporting in response to a request. An example verification mode service is described below in more detail with reference to FIG. 7. However, the description first turns to further aspects of the policy management service 508 in accordance with at least one embodiment.

Figure 6:
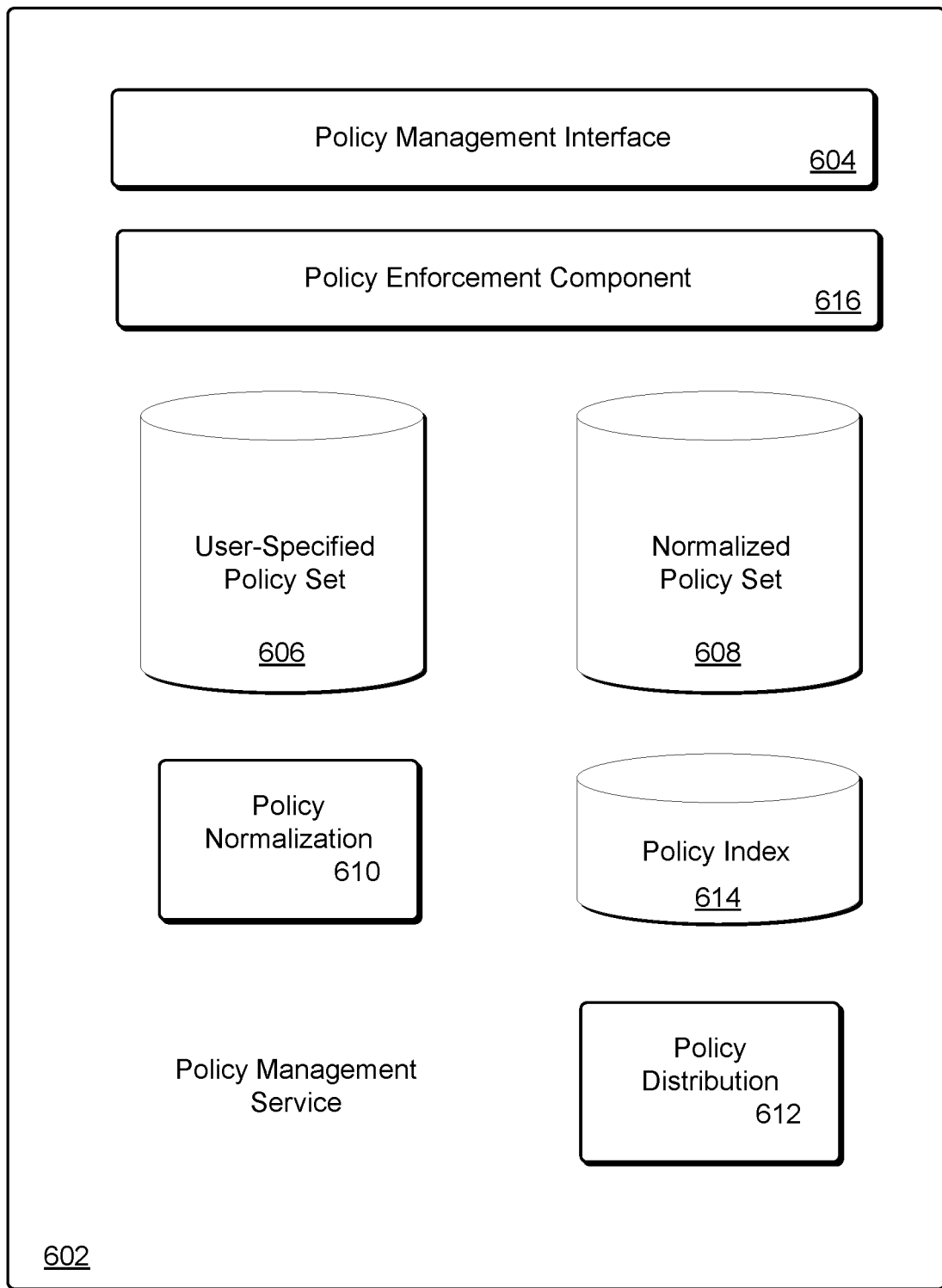
FIG. 6 is a schematic diagram depicting aspects of an example policy management service in accordance with at least one embodiment.

The policy management service 602 of FIG. 6 is an example of the policy management service 508 of FIG. 5, and includes a policy management interface 604 corresponding to the policy management interface 532 of FIG. 5. Users of the virtual resource provider 502 may interact with the policy management interface 604 to specify, view, edit and/or delete policies in a user-specified policy set 606 maintained by the policy management service 602. The policy management service 602 may further maintain a normalized policy set 608 corresponding to the user-specified set 606. The normalized policy set 608 may be maintained by a policy normalization component 610. The policy management service 602 may participate in policy enforcement, for example, the policy management service 602 may include a policy enforcement component 616 corresponding to one of the policy enforcement components 316-318 of FIG. 3. In particular, the policy enforcement component 616 may enforce policies referencing actions that may be requested with the policy management interface 604. Furthermore, in at least one embodiment, at least a portion of the normalized policy set 608, or a copy thereof, is distributed to policy enforcement components located throughout the virtual resource provider 502. The policy management service 602 may include a policy distribution component 612 configured at least to distribute the normalized policy set 608 throughout the virtual resource provider 502, for example, based at least in part on a policy index 614.

Policies in the user-specified policy set 606 may be specified with alphanumeric strings. A first example of such a policy is:
permit administrators*
corresponding to permission for members of the group with identifier "administrators" to perform all actions with respect to all resources associated with a particular virtual resource provider 502 (FIG. 5) customer account. A second example is:
deny jsmith*unless current_time in business_hours
corresponding to denying permission for a user with identifier "j smith" to perform any action outside of business hours. A third example is:

---
permit jsmith to {create, read, write, delete}
data_object_service:zone_1::/public/images
--- corresponding to permission for the user with identifier "jsmith" to create, read, write and delete data objects at a particular virtual resource having resource identifier "data_object_service:zone_1::/public/images". A fourth example is:

---
permit msmith to configure
{vcs::/example_corp/*, bds::/example_corp/*}
--- corresponding to permission for a user with identifier "msmith" to configure all virtual computer systems (provided by a virtual computing service "vcs") and block data volumes (provided by a block data service "bds") associated with a customer having customer identifier "example_corp". Each user-specified policy may be associated with a unique identifier.

The policy normalization component 610 may generate sets of normalized policies corresponding to user-specified policies, and store the normalized policies in the normalized policy set 608. For example, each policy in the normalized policy set 608 may have a form corresponding to the normal form policy 402 of FIG. 4. The policy normalization component 610 may generate multiple normal form policies corresponding to a user-specified policy, for example, due to decompounding with respect to policy elements 408-414. The fourth user-specified policy example described above may be decompounded to generate two normal form policies, both with the effect 406 element specifying a permit effect, the principal 408 element specifying the user with identifier "msmith", and the action 410 element specifying the configure action. For example, the resource 412 element of one of the normal form policies may specify all virtual computer systems associated with the customer identifier "example_corp", the resource 412 element of the other of the normal form policies may specify all block data volumes associated with the customer identifier "example_corp". In this example, the user-specified policy has been decompounded with respect to the resource 412 element. As another example, the policy normalization component 610 may be configured to decompound the first user-specified policy example described above with respect to the action 410 element and/or the resource 412 element.

Wildcards may be first "expanded" into a set of values, for example, based on a context of the user-specified policy, before being decompounded. The decompounding need not be complete with respect to policy element 408-414 (FIG. 4) values. For example, the policy normalization component 610 may be configured to protect particular subsets of policy element 408-414 values (policy element "atoms" or "indivisibles") from decompounding. As one example, the set of actions corresponding to "{create, read, write, delete}" may be protected from decompounding.

The policy normalization component 610 may reduce a size of the normalized policy set 608, for example, by reducing redundancy in the normalized policy set 608. The policy normalization component 610 may detect that a newly added normal form policy is contained within the scope of one or more of the normalized policy set 608, and delete the newly added normal form policy from the normalized policy set 608. Normal form policies, such as the normal form policy 402 of FIG. 4, may correspond to sets of points in one or more policy spaces, for example, spaces having dimensions corresponding to the policy elements 408-414 of the normal form, and/or Boolean-valued functions over the policy spaces. Each effect 406 element value may correspond to such a policy space. For example, there may be a permit space and a deny space. The policy enforcement components 316-318 (FIG. 3) may be configured to require an explicit permit in the absence of a deny in order to permit a particular action, that is, to require a point in a permit space without a corresponding point in the deny space. Wildcards may correspond to regions of such policy spaces. Element modifiers 416-422 may be used to define complimentary sets of the policy spaces. The policy normalization component 610 may detect whether the normal form policy 402 is within in the scope of a set of normal form policies (e.g., the normalized policy set 608) by determining whether the set of points corresponding to the normal form policy 402 is contained within the set of points corresponding to the set of normal form policies.

The policy normalization component 610 may further reduce the size of the normalized policy set 608 by compounding and/or recompounding normal form policies in the normalized policy set 608 with respect to policy elements 408-414 (FIG. 4). Some policy element 408-414 values may correspond to multiple other policy element 408-414 values, so that a single normal form policy 402 may correspond to a same policy space region as multiple other normal form policies. For example, a principal 408 element value corresponding to a group may be equivalent to multiple principal 408 element values corresponding to individual users. The policy normalization component 610 may be configured to detect compoundable subsets of the normalized policy set 608 and to compound the detected subsets along policy element 408-414 dimensions to configured granularities (which need not be the coarsest available granularity). Throughout generation and/or transformation of the normalized policy set 608, the policy normalization component 610 may be configured to maintain the set of parent policies 424 of each normal form policy 402. For example, the set of parent policies 424 may include the identifier of each user-specified policy that the normal form policy 402 participates in enforcing.

Different regions of the policy space(s) may be enforced by different policy enforcement components 316-318 (FIG. 3). Different policy enforcement components 316-318 may enforce overlapping, and even same, regions of the policy space(s). However, in at least one embodiment, different policy enforcement components 316-318 enforce disjoint regions of the policy space(s). The policy distribution component 612 may determine regions of the policy space(s), and corresponding subsets of the normalized policy set 608, to assign and/or distribute to the policy enforcement components 316-318. To facilitate such distribution, the policy distribution component 612 may establish and maintain the policy index 614. The policy index 614 may index the normalized policy set 608 with respect to policy element 408-414 (FIG. 4) values and/or subsets thereof. For example, the policy index 614 may index the normalized policy set 608 with respect to resource 412 and/or resource 412 type. Policies in the normalized policy set 608 may be multiply indexed, for example, with respect to multiple different policy element 408-414 values and/or value subsets. The policy distribution component 612 may distribute the normalized policy set 608 to the policy enforcement components 316-318 based at least in part on the policy index 614. For example, sets of indices of the policy index 614 may define policy enforcement domains corresponding to subsets of the normalized policy set 608, and the policy distribution component 612 may distribute such subsets to the policy enforcement components 316-318 as units. In at least one embodiment, each normal form policy 402 incorporates its indexing information and/or the policy index 614 is incorporated into the normalized policy set 608.

Figure 7:
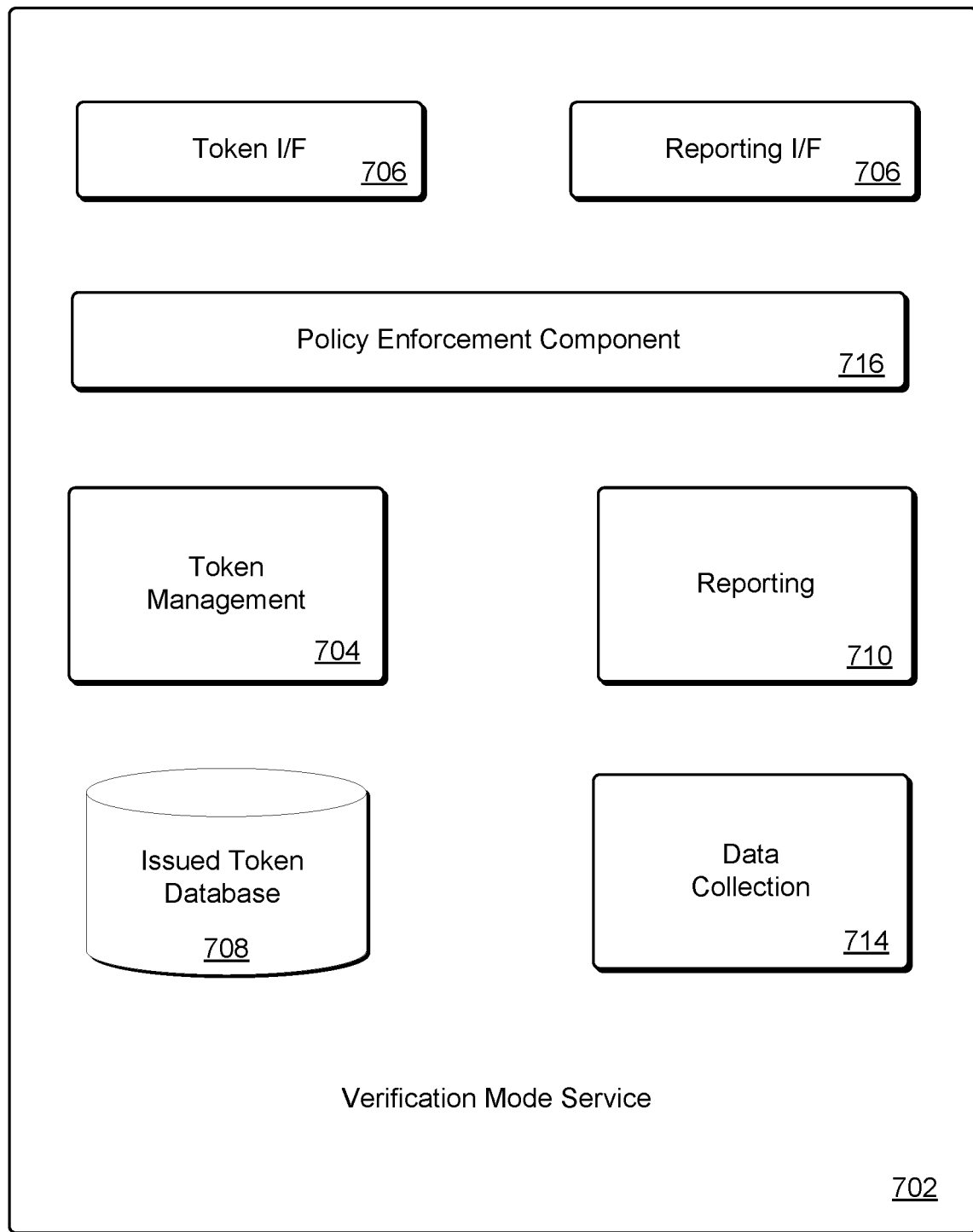
FIG. 7 is a schematic diagram depicting aspects of an example verification mode service in accordance with at least one embodiment.

The distributed nature of policy enforcement in the virtual resource provider 502 (FIG. 5) can complicate efforts to verify that a particular set of user-specified polices has its intended consequences. FIG. 7 depicts aspects of an example verification mode service 702 in accordance with at least one embodiment that can facilitate such verification. The verification mode service 702 may include a token management component 704 accessible through a token interface 706. The token management component 704 may issue verification mode tokens in response to authorized requests, record the issued tokens in an issued token database 708, and authenticate the issued tokens upon request. Following processing of the request 544 in verification mode, a reporting component 710 of the verification mode service 702 may prepare a verification mode report at a specified level of detail. Requests for such reports, as well as level of detail specification, may be made with a reporting interface 712 of the verification mode service 702. Such report requests may not include all the data required by the reporting component 710. The verification mode service 702 may further include a data collection component 714 configured to interact with other services 504-512 of the virtual resource provider 502 to obtain the required data.

Policies with respect to actions that may be requested with the token interface 706 and/or the reporting interface may be enforced by a policy enforcement component 716 corresponding to one of the policy enforcement components 316-318 of FIG. 3. For example, such policies may define a set of users of the virtual resource provider 502 (FIG. 5) authorized to be issued verification mode tokens, and may require an authentic verification mode token before providing the verification mode report. The token management component 704 may issue multiple types of tokens, for example, tokens authorizing verification mode reporting may be a separate type from tokens authorizing substitution of decision data during verification mode processing of the request 544. Tokens authorizing substitution of different subsets and/or types of decision data may also be separate types. Verification mode policies may distinguish between different types of tokens. Generation, issuance, authentication and revocation of cryptographic tokens are well known in the art, and need not be described here in detail.

Requests at the reporting interface 712 may specify a type of report and/or level of reporting detail. For example, the workflow management component 322 (FIG. 3) may generate the request in response to detecting a verification mode request at one of the resource interfaces 306-308. The reporting component 710 may generate the requested report based on a corresponding report template, utilizing the data collection component 714 to collect data as necessary. Fields that may be included in the verification mode report include one or more results of evaluation of the verification mode request by one or more of the policy enforcement components 316-318, a subset of the normalized policy set 608 (FIG. 6) and/or the user-specified policy set 606 relevant to the verification mode request and/or utilized during the evaluation by the one or more policy enforcement components 316-318, decision data utilized during the evaluation, virtual resource provider 502 contextual operating data capable of influencing the evaluation, and/or versions thereof filtered and/or summarized to the specified level of detail. The reporting component 710 may be configured to map a set of normal form policies to a corresponding set of user-specified policies based at least in part on the set of parent policies 424 (FIG. 4) referenced by each normal form policy 402.

Figure 8:
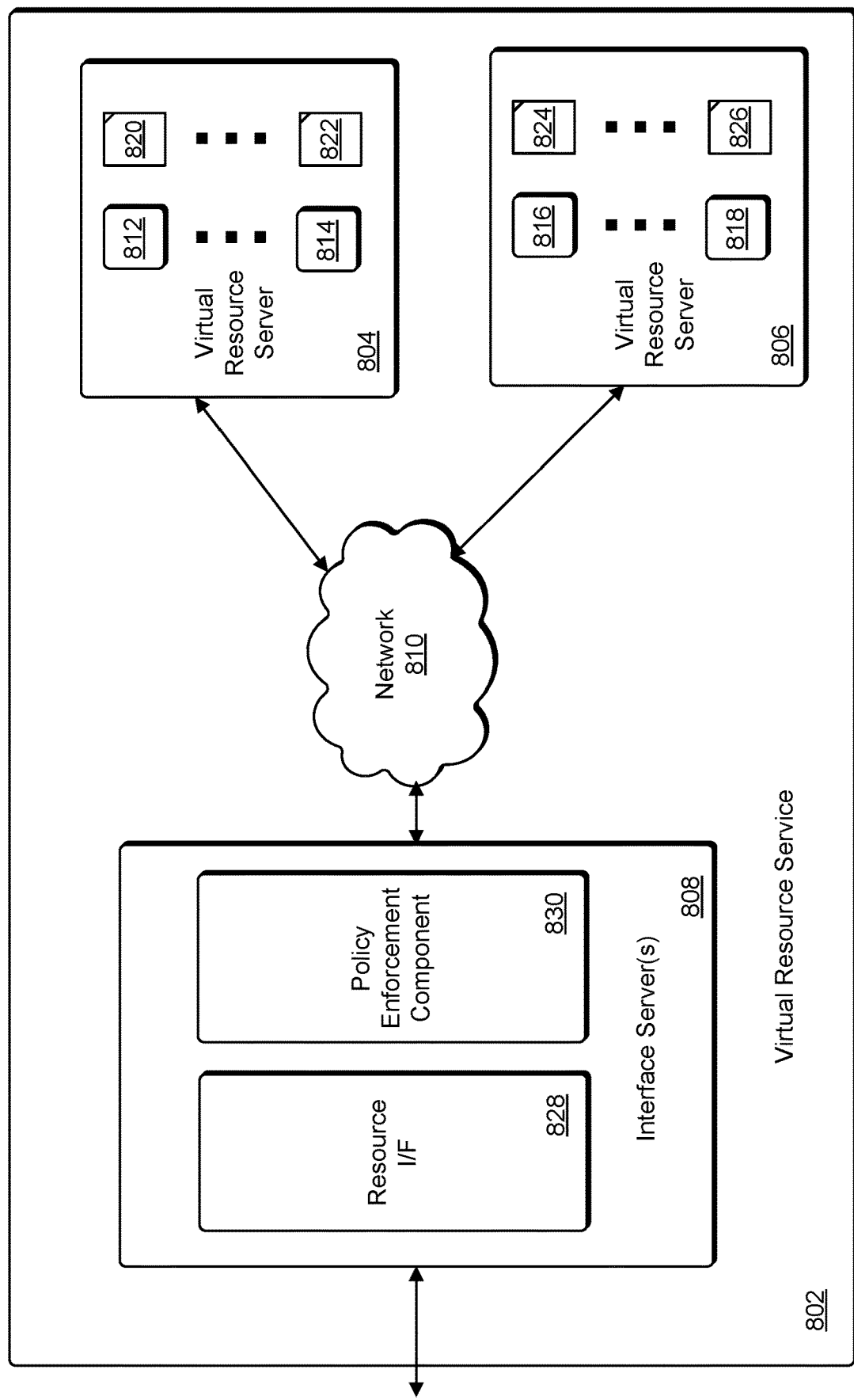
FIG. 8 is a schematic diagram depicting aspects of an example virtual resource service in accordance with at least one embodiment.

Each virtual resource service 504-506 (FIG. 5) may be implemented with a collection of physical server computers and/or network elements. FIG. 8 depicts aspects of a virtual resource service 802 in accordance with at least one embodiment. The virtual resource service 802 depicted in FIG. 8 is an example of the virtual resource service 504 of FIG. 5. The virtual resource service 802 example includes multiple virtual resource servers 804-806 and one or more interface servers 808 interconnected by a network 810. The provisioned resources 520-522 and policies 536-538 of FIG. 5 may be distributed across the virtual resource servers 804-806 of FIG. 8 utilizing any suitable data distribution technique. For example, each virtual resource server 804, 806 may maintain a subset 812-814, 816-818 of the provisioned resources 520-522, and a corresponding subset 820-822, 824-826 of the policies 536-538. Such subsets may deliberately overlap for various purposes including data durability and service capability.

The interface server(s) 808 may (collectively) maintain a resource interface 828 and a policy enforcement component 830. The resource interface 828 may correspond to one of the resource interfaces 306-308 of FIG. 3. Similarly, the policy enforcement component 830 may correspond to one of the policy enforcement components 316-318 of FIG. 3. The policy enforcement component 830 of FIG. 8 may enforce policies referencing actions that may be requested with the resource interface 828 of FIG. 8. Such policies may include policies distributed by the policy management service 602 (FIG. 6), policies 820-826 stored on the virtual resource servers 804-806, and policies accompanying requests to the resource interface 828 such as the policy 546 of FIG. 5. For example, the resource interface 828 may require a "permit" evaluation by the policy enforcement component 830 before further processing a request.

Figure 9:
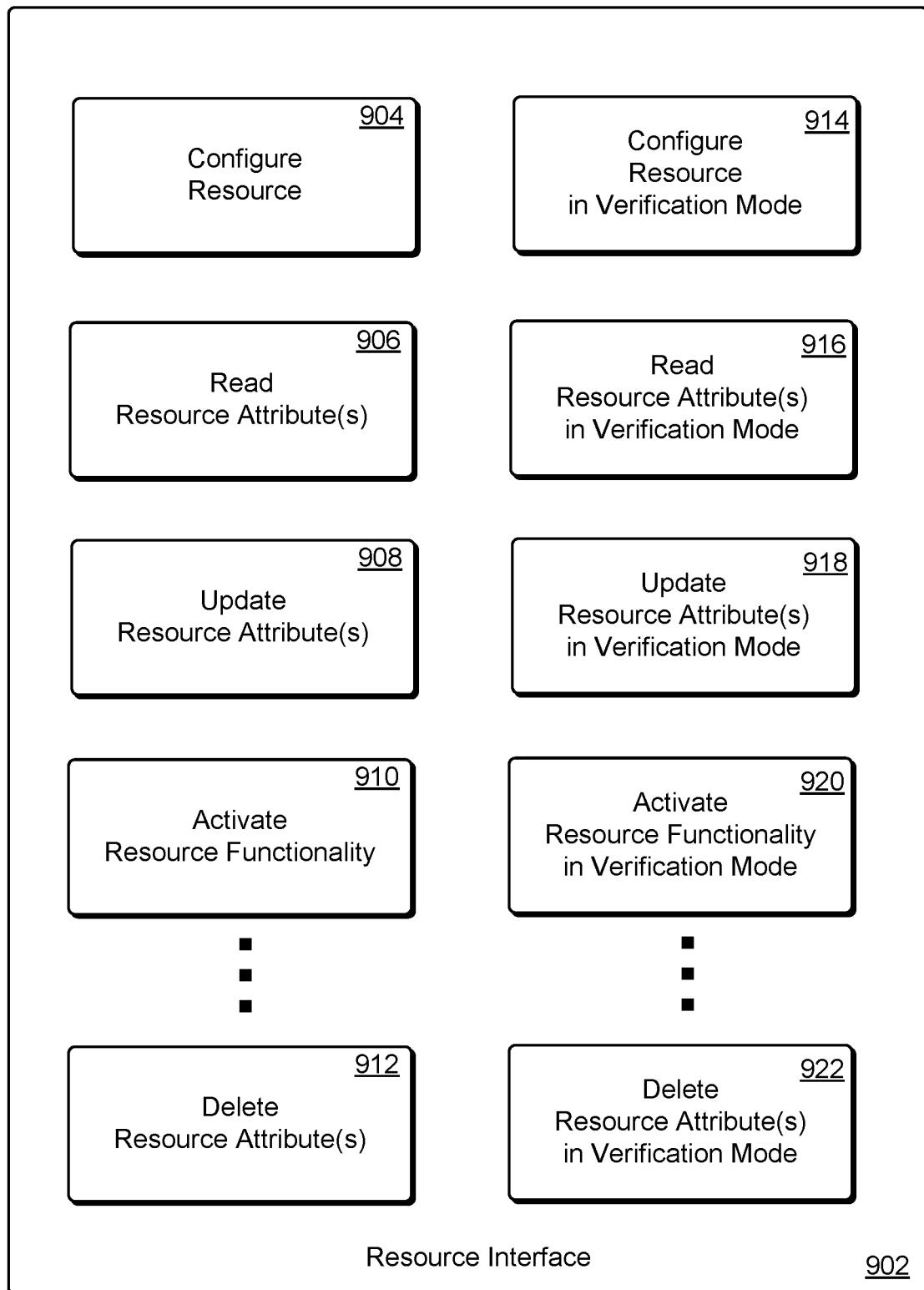
FIG. 9 is a schematic diagram depicting aspects of an example resource interface in accordance with at least one embodiment.

FIG. 9 depicts aspects of a resource interface 902 in accordance with at least one embodiment. The resource interface 902 may include any suitable number of interface elements of any suitable type. In this example, the resource interface 902 includes a configure resource interface element 904, a read resource attribute(s) interface element 906, an update resource attribute(s) interface element 908, an activate resource functionality interface element 910, and a delete resource attribute(s) interface element 912. In addition, the resource interface 902 includes distinct interface elements 914-922 corresponding to verification mode versions of the interface elements 904-912. Each interface element 904-922 defines a structured interaction with the provisioned resources 812-818 (FIG. 8) including a request to perform a set of actions with respect to at least one of the provisioned resources 812-818. In the resource interface 902 example, each interface element 904-922 corresponds to a set of messages of a web-based services protocol such as extensible markup language (XML) encoded remote procedure calls (e.g., XML-RPC) or a simple object access protocol (e.g., SOAP).

Clients 204-206 (FIG. 2) may utilize the configure resource interface element 904 to request a configuration and/or reconfiguration of one or more of the provisioned resources 812-818 (FIG. 8). For example, if the provisioned resources 812-818 include data object stores, the configure resource interface element 904 may enable clients 204-206 to set a maximum size of a data object store over which they have authority. Clients 204-206 may utilize the read resource attribute(s) interface element 906 to request a read or view of one or more attributes of one or more of the provisioned resources 812-818. For example, the read resource attribute(s) interface element 906 may enable clients 204-206 to obtain copies of specified data objects from specified data object stores. Clients 204-206 may utilize the update resource attribute(s) interface element 908 to request an update of one or more attributes of one or more of the provisioned resources 812-818. For example, the update resource attribute(s) interface element 908 may enable clients 204-206 to update specified data objects and/or create specified data objects in specified data object stores.

Some provisioned resources 812-818 (FIG. 8) may have functionality that can be activated, and the activate resource functionality interface element 910 may be utilized to request an activation of that functionality. For example, some types of data object store may have a capability to analyze stored data objects, and the activate resource functionality interface element 910 may enable authorized clients to start, stop, suspend and/or perform the analysis. The delete resource attribute(s) interface element 912 may enable clients 204-206 (FIG. 2) to request a deletion and/or re-initialization of one or more attributes of one or more of the provisioned resources 812-818. For example, clients 204-206 with sufficient authorization may delete specified data objects from specified data object stores.

In the resource interface 902 example, utilization of the verification mode versions 914-922 of the interface elements 904-912 indicates that the corresponding request is to be processed in the verification mode (is a "verification mode request"). For example, the resource interface 828 (FIG. 8) may submit the request to the policy enforcement component 830 as usual, but inhibit any actions that would usually result from a "permit" evaluation result. Regardless of the evaluation result, the resource interface 828 may respond to the request with a verification mode report. For example, the resource interface 828 and/or a controlling workflow may invoke an interface element of the verification mode reporting interface 712 (FIG. 7) to generate the verification mode report. The use of dedicated interface elements 914-922 is only one technique for indicating that a request is to be processed in verification mode. Alternate embodiments may utilize any suitable technique. For example, interface elements 904-912 may incorporate an explicit indicator (e.g., a "flag") for indicating the request is a verification mode request. The resource interface 902 may include an explicit set of interface elements (not shown in FIG. 9) for activating and deactivating verification mode processing. As a further alternative, or in addition, receipt of a verification mode token (e.g., issued by the verification mode service 702) may act as an indication that an associated request is to be processed in verification mode.

Figure 10:
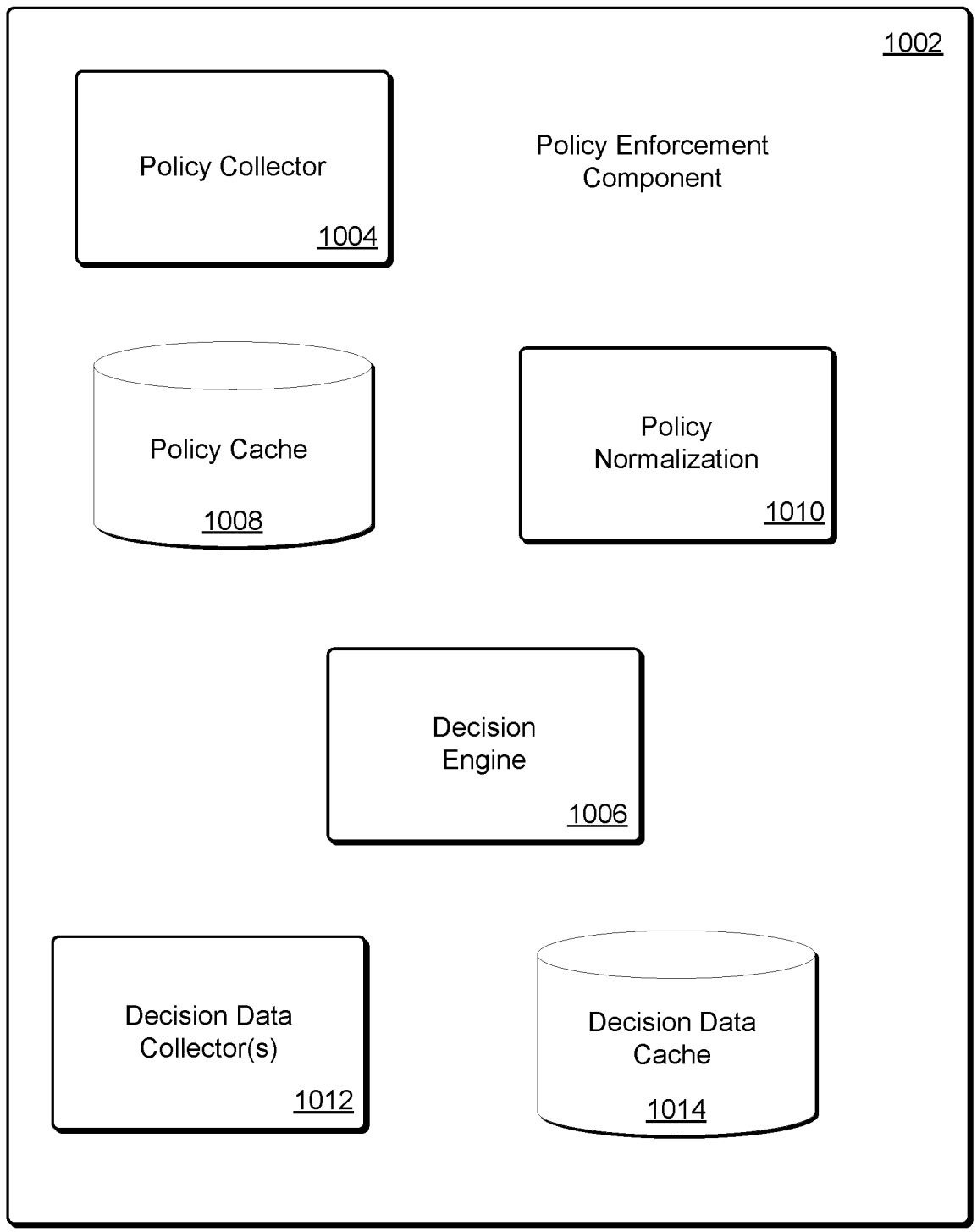
FIG. 10 is a schematic diagram depicting aspects of an example policy enforcement component in accordance with at least one embodiment.

Each interface element 904-922 may correspond to a request (e.g., the request 544 of FIG. 5) subject to a subset of the policies 534-542, 546. In order to evaluate the request with respect to the subset of the policies 534-542, 546, the resource interface 828 (FIG. 8) receiving the request may submit the request to the policy enforcement component 830. FIG. 10 depicts aspects of an policy enforcement component 1002 example in accordance with at least one embodiment. The policy enforcement component 1002 of FIG. 10 is an example of the policy enforcement component 830 of FIG. 8.

The policy enforcement component 1002 may include a policy collector 1004 configured at least to collect relevant policies 534-542, 546 (FIG. 5) from locations throughout the virtual resource provider 502, and store them local to a decision engine 1006 in a policy cache 1008. Collected policies may not be in normal form 402 (FIG. 4). The policy enforcement component 1002 may further include a policy normalization component 1010 having functionality corresponding to that of the policy normalization component 610 (FIG. 6) of the policy management service 602. The policy normalization component 1010 may normalize the set of policies in the policy cache 1008. The decision engine 1006 may evaluate requests submitted to the policy enforcement component 1002 with respect to relevant policies in the policy cache 1008. At times, additional data may be required to support particular decisions with respect to particular policies. The policy enforcement component 1002 may still further include one or more decision data collectors 1012 configured at least to collect the required decision support data ("decision data") from locations throughout the virtual resource provider 502. Collected decision data may be stored local to the decision engine 1006 in a decision data cache 1014.

The policy collector 1004 may update the policy cache 1008 responsive to policy update notifications, for example, received from the policy management service 602 (FIG. 6) and/or the virtual resource servers 804-806 (FIG. 8). The policy collector 1004 may subscribe to notifications of updates to relevant policies and/or policy sets maintained at the policy management service 602 and/or the virtual resource servers 804-806. Alternatively, or in addition, the policy collector 1004 may periodically search for changes to policies in the policy cache 1008 and/or for newly relevant policies.

The decision data collector(s) 1012 may include one or more data collectors configured to interact with the decision data providers 512 (FIG. 5). The decision data collector(s) 1012 may collect decision data responsive to requests by the decision engine 1006, for example, requests by the decision engine 1006 for decision data that is not present in the decision data cache 1014 and/or that is out-of-date. The decision data collector(s) 1012 may furthermore maintain one or more subsets and/or types of decision data in the decision data cache 1014, for example, responsive to update notifications from the decision data providers 512 and/or with updates discovered by periodic searching.

Figure 11:
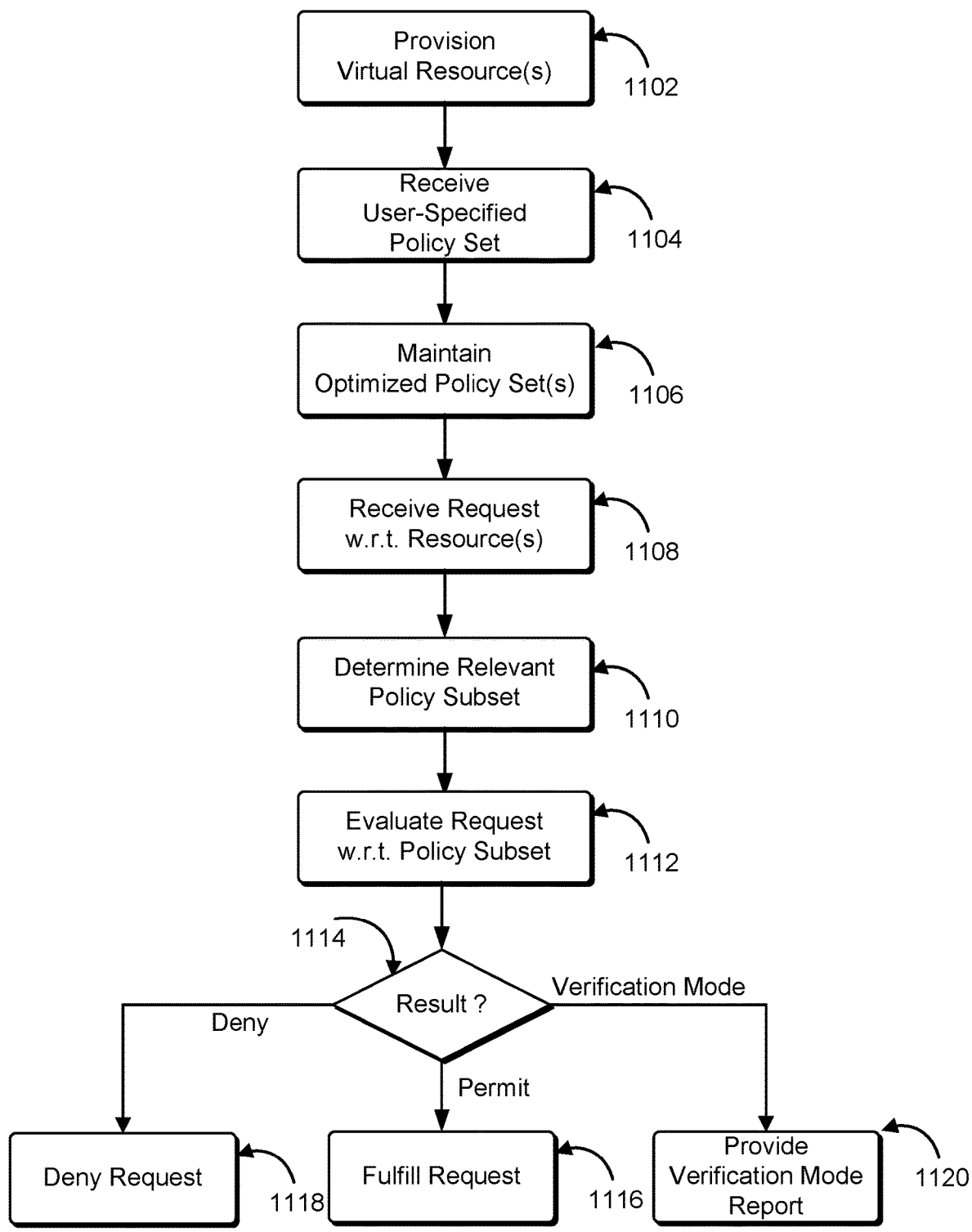
FIG. 11 is a flowchart depicting example steps for policy enforcement in accordance with at least one embodiment.

The description now turns to example procedures that may be performed by, for example, the virtual resource provider 502 (FIG. 5). FIG. 11 depicts example steps for policy enforcement in accordance with at least one embodiment. At step 1102, one or more virtual resources may be provisioned. For example, authorized users may interact with the provisioning interface 310 of FIG. 3 to provision one or more of the virtual resources 218-220 of FIG. 2. At step 1104, one or more user-specified policies may be received. For example, authorized users may specify policies with the policy management interface 532 of the policy management service 508, with policy management interface elements of resource interfaces 528-530, and/or with policy specifications that accompany requests such as the policy 546. At step 1106, one or more optimized policy sets may be maintained. For example, the policy management service 602 (FIG. 2) may maintain the normalized policy set 608 and the policy index 614, and distribute the normalized policy set 608 to the policy enforcement components 316-318 based at least in part on the policy index 614. In addition, the policy enforcement components 316-318 may collect relevant policies and locally normalize and/or re-normalize the collected policies.

At step 1108, a request may be received with respect to one or more virtual resources. For example, a user may make the request with the resource interface 828 (FIG. 8) of the virtual resource service 802 with respect to one or more of the virtual resources 812-818 maintained by one or more of the virtual resource servers 804-806. At step 1110, a relevant policy subset may be determined. For example, the resource interface 828 may submit the request to the policy enforcement component 1002 (FIG. 10) for evaluation, and the policy enforcement component 1002 may search the policy cache 1008 for policies relevant to the request. A particular normal form policy 402 (FIG. 4) may be determined relevant to the request when one or more principals associated with the request (e.g., the user making the request) match a value of the principal(s) 408 element of the policy 402, when one or more actions associated with the request match a value of the action(s) 410 element of the policy 402, when one or more resources associated with the request match a value of the resource(s) 412 element of the request, and/or when one or more attributes of the request (or a context of the request) satisfies the condition(s) 414 of the policy 402.

At step 1112, the request may be evaluated with respect to the relevant policy subset determined at step 1110. For example, the decision engine 1006 (FIG. 10) may evaluate the request with respect to the relevant policy subset in the policy cache 1008 based at least in part on decision data in the decision data cache 1014. At step 1114, a result of the evaluation of step 1112 may be identified. For example, the resource interface 828 (FIG. 8) may identify the result based at least in part on information provided by the policy enforcement component 830. The resource interface 828 may determine that the request is to be permitted, in which case a procedure incorporating step 1114 may progress to step 1116. The resource interface 828 may determine that the request is to be denied, in which case the procedure may progress to step 1118. The resource interface 828 may determine that the request is to be processed in verification mode, in which case the procedure may progress to step 1120. For example, the resource interface 828 may determine that the request is to be processed in verification mode based at least in part on an indicator incorporated into and/or accompanying the request, such as a verification mode flag or a verification mode token.

At step 1116, the request may be fulfilled. For example, the resource interface 828 (FIG. 8) may interact with one or more of the virtual resource servers 804-806 and/or the provisioned resources 812-818 to fulfill the request. Alternatively, or in addition, the resource interface 828 may establish a request fulfillment workflow. At step 1118, the request may be denied. For example, the resource interface 828 may respond to the request with a "request denied" message. Alternatively, or in addition, the resource interface 828 may establish a request denial workflow. The request denied message may contain minimal information so as to avoid information leakage to unauthorized users. The resource interface 828 may even be configured to silently deny requests, so that no request denied message is sent. At step 1120, a verification mode report may be generated and provided to the sender of the request. For example, the resource interface 828 may interact with the reporting interface 712 (FIG. 7) of the verification mode service 702 to request and/or generate the verification mode report. Alternatively, or in addition, the resource interface 828 may establish a verification mode report workflow.

Figure 12:
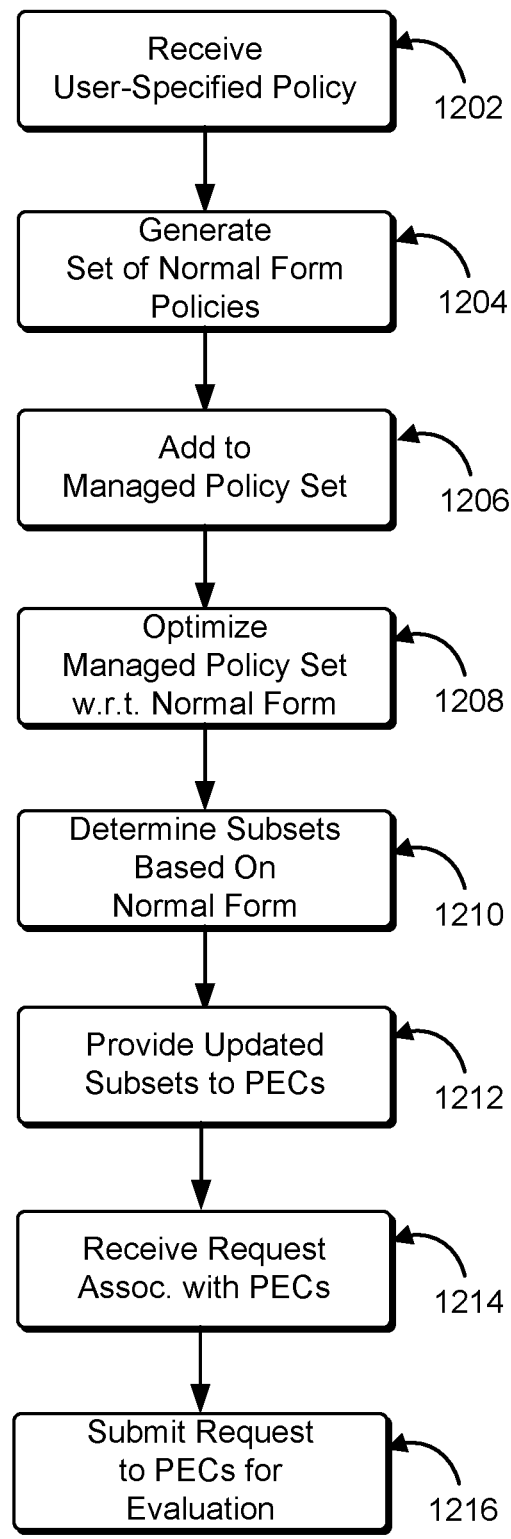
FIG. 12 is a flowchart depicting example steps for maintaining optimized policy sets in accordance with at least one embodiment.

FIG. 12 depicts example steps for maintaining optimized policy sets in accordance with at least one embodiment. At step 1202, a user-specified policy may be received. For example, the policy management interface 604 (FIG. 6) may receive a specification of a policy from a user at the policy management interface 604. At step 1204, a set of normal form policies may be generated. For example, the policy normalization component 610 may generate a set of normal form policies corresponding to the user-specified policy provided at step 1202. At 1206, the generated set of normal form policies may be added to a managed policy set. For example, the policy management service 602 may add the set of normal form policies generated at step 1204 to the normalized policy set 608.

At step 1208, the managed policy set may be optimized with respect to the normal form. For example, the policy normalization component 610 (FIG. 6) may decompound the normalized policy set 608, reduce redundancy in the normalized policy set 608 and/or recompound the normalized policy set 608 with respect to the normal form 402 (FIG. 4). At step 1210, one or more subsets of the managed policy set may be determined based at least in part on the normal form. For example, the policy distribution component 612 may update the policy index 614 for the updated normalized policy set 608, and determine the one or more subsets for distribution based at least in part on the updated policy index 614.

At step 1212, the one or more subsets of the managed policy set may be distributed to one or more policy enforcement components (PECs). For example, the policy distribution component 612 may notify policy enforcement components 316-318 (FIG. 3) of the updated normalized policy set 608 and/or the updated policy index 614. Different policy enforcement components 316-318 may have different subscriptions to different portions of the policy index 614, and the policy distribution component 612 may be configured to send update notifications to those policy enforcement components with matching subscriptions.

At step 1214, a received request may be associated with one or more policy enforcement components 316-318 (FIG. 3). The virtual resource provider 502 (FIG. 5) may make an explicit determination of an association between the received request and a particular set of the policy enforcement components 316-318. Alternatively, or in addition, the associated may be determined at least in part by the user interface 224-226 (FIG. 2) selected by the user to place the request. For example, a request arriving at the resource interface 828 (FIG. 8) may be associated with the policy enforcement component 830. At step 1216, the received request may be submitted to the associated one or more policy enforcement components 316-318 for evaluation.

Figure 13:
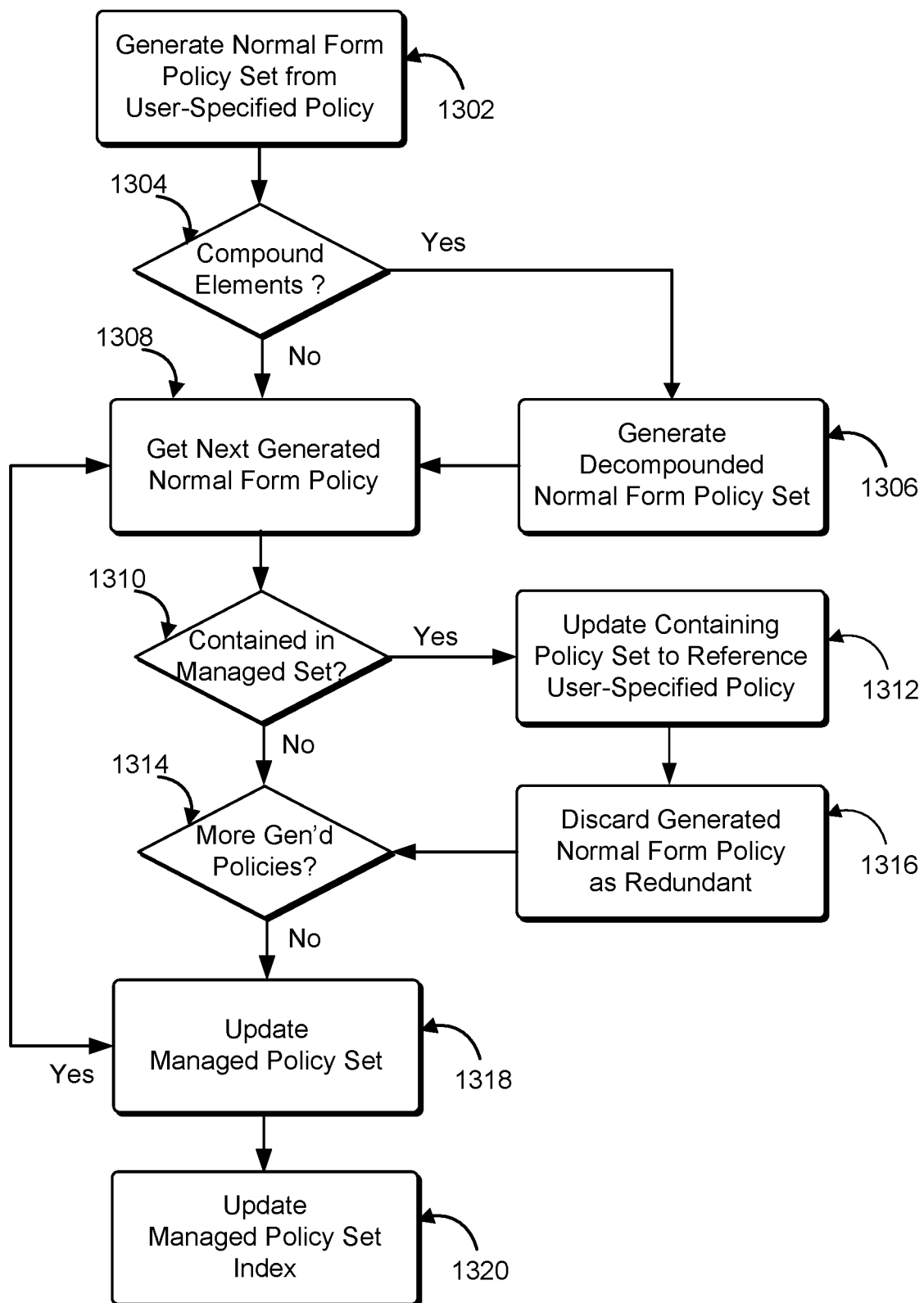
FIG. 13 is a flowchart depicting example steps for updating a normalized policy set in accordance with at least one embodiment.

FIG. 13 depicts example steps for updating the normalized policy set 608 (FIG. 6). At step 1302, a set of normal form policies may be generated that correspond to a user-specified policy. At step 1304, it may be determined whether the generated set of normal form policies includes policy elements with compound values ("compound elements"), for example, by the policy normalization component 610. If so, a procedure incorporating step 1304 may progress to step 1306. Otherwise, the procedure may progress to step 1308. At step 1306, a set of normal form policies having decompounded policy element values may be generated that corresponds to the set of normal form policies generated at step 1302, for example, by the policy normalization component 610.

At step 1308, a next (e.g., a first) normal form policy may be selected from the generated set of normal form policies. At step 1310, it may be determined whether the selected normal form policy is contained in a managed set. For example, the policy normalization component 610 (FIG. 6) may determine whether the normal form policy selected at step 1308 is contained by one or more of the policies in the normalized policy set 608. If so, the selected normal form procedure has been determined to be redundant, and the procedure may progress to step 1312. Otherwise, the procedure may progress to step 1314. At step 1312, one or more of the containing policies determined at step 1310 may be updated to reference the user-specified policy of step 1302 and, at step 1316, the selected normal form policy discarded as redundant. For example, the policy normalization component 610 may update the set of parent policies 424 (FIG. 4) of the containing policy set to reference the user-specified policy.

At step 1314, it may be determined whether there are more policies to be checked for redundancy in the generated normal form policy set. If so, the procedure may return to step 1308. Otherwise, the procedure may progress to step 1318. At step 1318, the managed policy set may be updated. For example, the policy normalization component 610 may update the normalized policy set 608 with those of the generated normal form policies not discarded as redundant. At step 1320, a managed policy set index may be updated. For example, the policy distribution component 612 may update the policy index 614 to account for the policies added to the normalized policy set 608 at step 1318.

Figure 14:
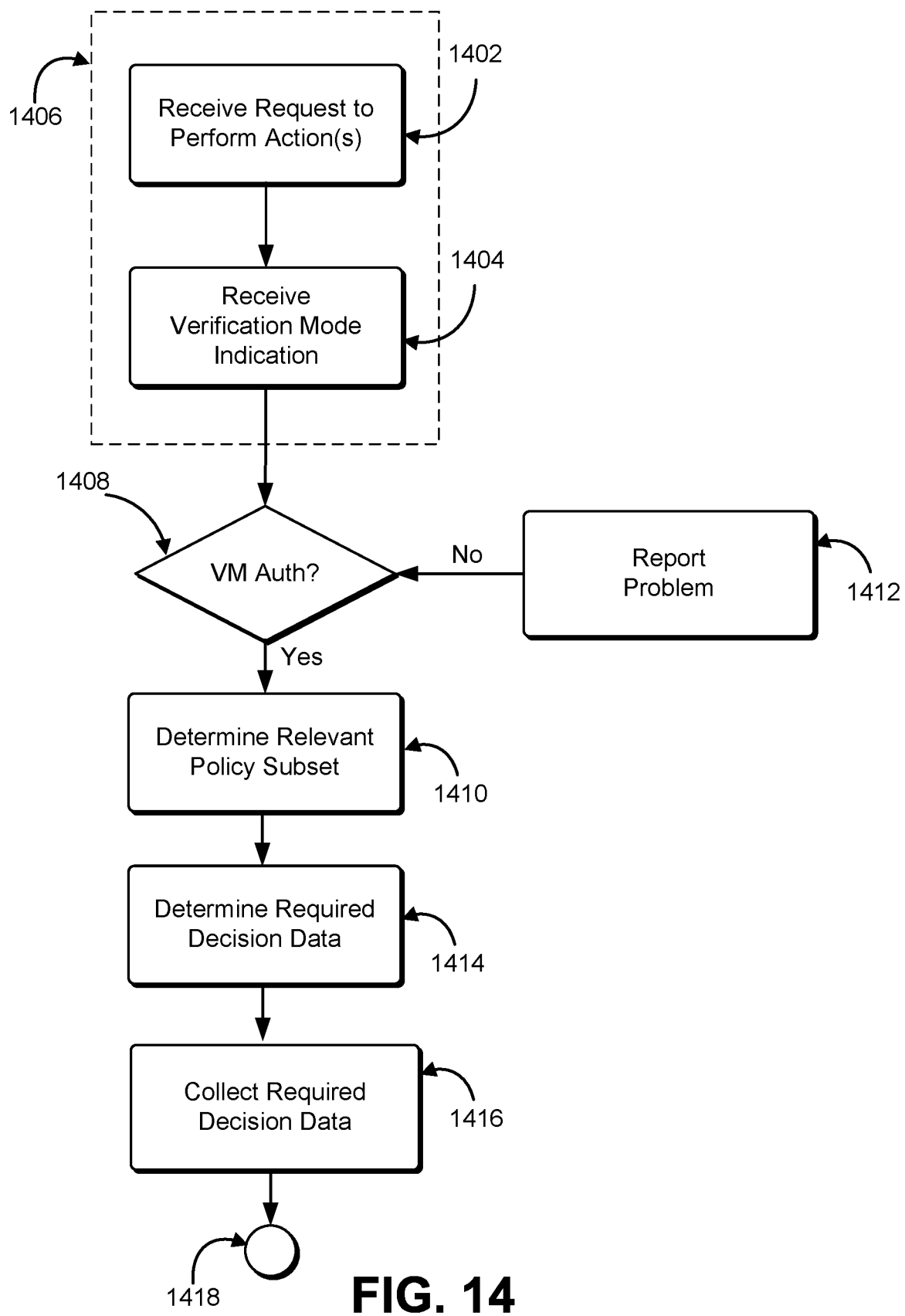
FIG. 14 is a flowchart depicting example steps for verification mode in accordance with at least one embodiment.
Figure 15:
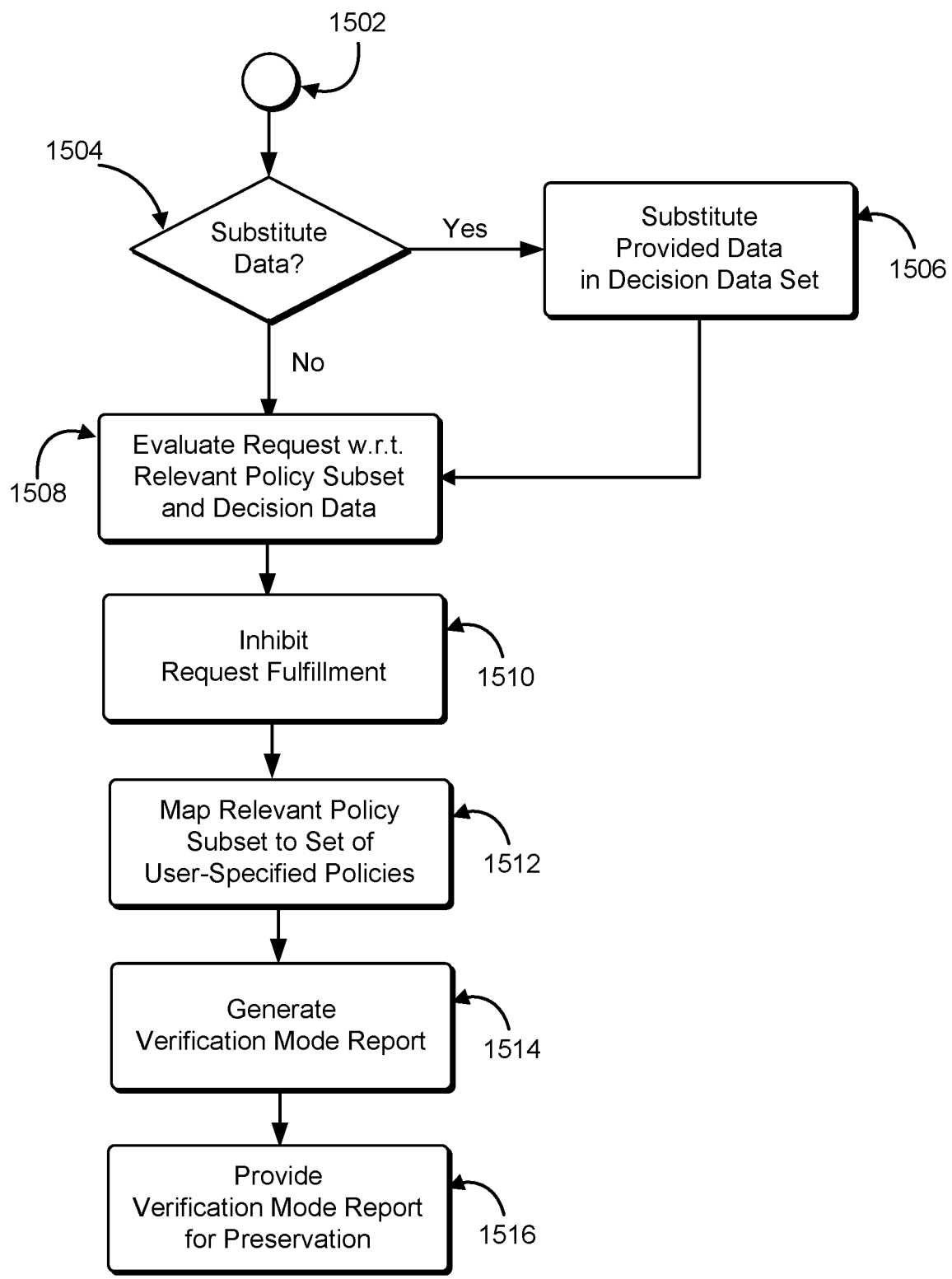
FIG. 15 is a flowchart depicting further example steps for verification mode in accordance with at least one embodiment.

FIG. 14 and FIG. 15 depict example steps for verification mode in accordance with at least one embodiment. At step 1402, a request to perform one or more actions may be received. For example, the resource interface 828 (FIG. 8) may receive the request to perform one or more actions with respect to the provisioned resources 812-818. At step 1404, a verification mode indication may be received. For example, the resource interface 828 may receive the verification mode indication such as a verification mode token in association with the request of step 1402. Dashed line 1406 indicates that step 1402 and 1404 may be integral. For example, the request of step 1402 may incorporate the verification mode indication and/or the request and the verification mode indication may be received as part of a same interaction with the resource interface 828.

At step 1408, it may be determined whether the verification mode indication is authentic and/or authorized. For example, the resource interface 828 (FIG. 8) may submit a received verification mode token to the verification mode service 702 (FIG. 7) for authentication. If so, a procedure incorporating step 1408 may progress to step 1410. Otherwise, the procedure may progress to step 1412 to report a problem with verification mode to the user making the request.

At step 1410, a relevant policy subset may be determined. For example, the policy enforcement component 1002 (FIG. 10) may determine a subset of policies in the policy cache 1008 that are relevant to the request received at step 1402. At step 1414, a required set of decision data may be determined. For example, the decision engine 1006 may request decision data required to evaluate the request with respect to the relevant policy subset determined at step 1410 from the decision data cache 1014, and the requested decision data may correspond to the required set. At times, the decision data cache 1014 may not contain each piece of the required set of decision data. At step 1416, the required set of decision data may be collected. For example, the decision data collector(s) 1012 may update the decision data cache 1014 as necessary to contain the required set of decision data.

Circle 1418 is a diagrammatic connector corresponding to a like diagrammatic connector 1502 of FIG. 15. The verification mode indication received at step 1404 may include and/or be accompanied by substitute decision data. The verification mode authentication step 1408 may include authentication of an authority to replace collected decision data with the substitute decision data. At step 1504, it may be determined whether one or more pieces of the set of decision data collected at step 1416 is to be replaced with substitute data. For example, the decision engine 1006 (FIG. 10) may so determine based at least in part on the verification mode indication received at step 1404. If so, the procedure may progress to step 1506. Otherwise, the procedure may progress to step 1508. At step 1506, the decision data collected at step 1416 may be replaced by the substitute decision data. For example, the decision engine 1006 may utilize the substitute decision data as indicated by the verification mode indication received at step 1404.

At step 1508, the request received at step 1402 may be evaluated with respect to the relevant policy subset determined at step 1410 and the decision data collected at step 1416 and/or the substitute decision data, if any. For example, the decision engine 1006 (FIG. 10) may perform the evaluation. At step 1510, request fulfillment may be inhibited. For example, the resource interface 828, responsive to the verification mode authentication of step 1408, may inhibit request fulfillment independent of the result of the evaluation of step 1508.

At step 1512, the relevant policy subset determined at step 1410 may be mapped to a set of user-specified policies to be reported. For example, each of the relevant policy subset may be in normal form 402 (FIG. 4), and the reporting component 710 (FIG. 7) of the verification mode service 702 may map each of the relevant policy subset to the user-specified policies referenced by the set of parent policies 424 of the policy. In at least one embodiment, the union of such sets correspond to the set of user-specified policies to be reported. At step 1514, a verification mode report may be generated, for example, by the reporting component 710 utilizing the data collection component 714 as necessary. At step 1516, the verification mode report may be provided for presentation. For example, the verification mode service 702 may provide the verification mode report generated at step 1514 to the user that made the request of step 1402. In at least one embodiment, the user is notified of the generation of the verification mode report, and may later obtain the verification mode report with the reporting interface 712.

Figure 16:
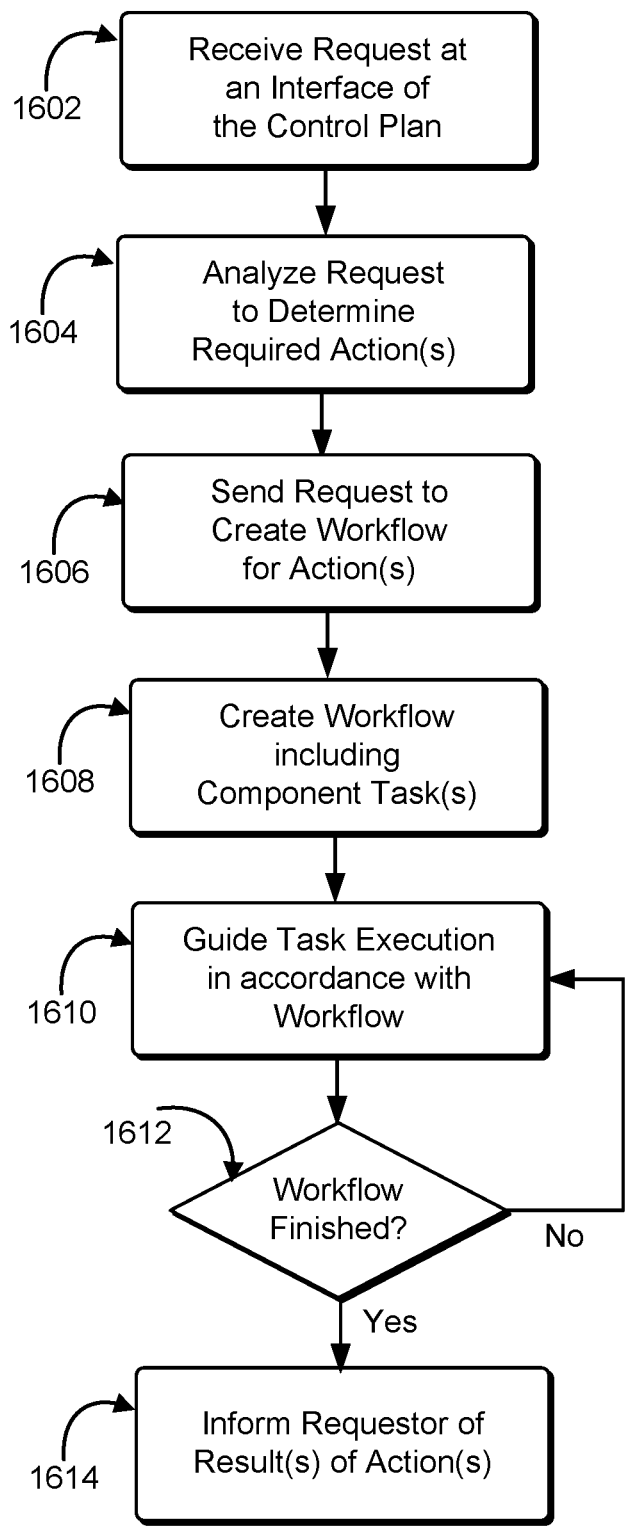
FIG. 16 is a flowchart depicting example steps for workflow management in accordance with at least one embodiment.

As described above with reference to FIG. 3, the control plane 302 may be facilitated by one or more workflows maintained by the workflow management component 322. FIG. 16 depicts example steps for workflow management in accordance with at least one embodiment. At step 1602, a request may be received by an interface of the control plane 302 (FIG. 3). For example, one of the user interfaces 304 of the control plane 302 may receive the request from a user, customer and/or administrator of the virtual resource provider 202. The request may be a call to a programmatic interface such as an application programming interface (API) or a web services interface, e.g., utilizing a Simple Object Access Protocol (SOAP) call. Alternatively, or in addition, the request may be received through a graphical user interface (GUI) such as a web-based GUI. At step 1604, the request may be analyzed to determine one or more actions required to successfully complete the request. For example, the provisioning interface 310 may analyze the request, and determine a set of actions required to provision a set of virtual resources 218-220 (FIG. 2). When an interface element receiving the request corresponds to a specific action to be performed, the interface may extract information from the request to be utilized in determining aspects and/or parameters of the action to be performed.

At step 1606, a request may be sent to create a workflow based at least in part on the one or more actions determined at step 1604. For example, provisioning interface 310 (FIG. 3) may send the request to the workflow management component 322. The request to create the workflow may include the action(s), action metadata such as type of action, and/or action parameters. In at least one embodiment, the control plane 302 and/or the workflow management component 322 maintains a job queue for such requests, and workflows are created responsive to new additions to the job queue. At step 1608, a workflow and one or more component tasks may be created. For example, the workflow management component 322 may analyze the request of step 1606 to determine the appropriate workflow and component tasks to create.

At step 1610, execution of the component task(s) may be guided in accordance with the workflow. For example, the workflow management component 322 (FIG. 3) may activate elements of interfaces of various implementation resources to provision the set of virtual resources. Alternatively, or in addition, the workflow management component 322 may manage bids for execution of the component task(s) by components of the virtual resource provider 202. At step 1612, it may be determined whether the workflow has finished. For example, the workflow management component 322 may determine whether a final task in a sequence of tasks managed by the workflow has completed. If so, a procedure incorporating step 1612 may progress to step 1614. Otherwise the procedure may return to step 1610 for a next task and/or task sequence. Workflows may guide multiple task sequences executing in parallel. In this case, it may be that the workflow is not finished until each of the multiple task sequences completes and/or an explicit workflow finished flag is set by one of the component tasks. At step 1614, the sender of the request of step 1602 may be informed of result(s) of the action(s).

The various embodiments described herein may be implemented in a wide variety of operating environments, which in some cases may include one or more user computers, computing devices, or processing devices which may be utilized to operate any of a number of applications. User or client devices may include any of a number of general purpose personal computers, such as desktop or laptop computers running a standard operating system, as well as cellular, wireless, and handheld devices running mobile software and capable of supporting a number of networking and messaging protocols. Such a system also may include a number of workstations running any of a variety of commercially-available operating systems and other known applications for purposes such as development and database management. These devices also may include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. Such a network may include, for example, a local area network, a wide-area network, a virtual private network, the Internet, an intranet, an extranet, a public switched telephone network, an infrared network, a wireless network, and any combination thereof. The network may, furthermore, incorporate any suitable network topology. Examples of suitable network topologies include, but are not limited to, simple point-to-point, star topology, self-organizing peer-to-peer topologies, and combinations thereof.

In embodiments utilizing a web server, the web server may run any of a variety of server or mid-tier applications, including HTTP servers, FTP servers, CGI servers, data servers, Java servers, and business application servers. The server(s) also may be capable of executing programs or scripts in response requests from user devices, such as by executing one or more web applications that may be implemented as one or more scripts or programs written in any programming language, such as Java C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment may include a variety of data stores and other memory and storage media as discussed above. These may reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device may include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also may include a computer-readable storage media reader, a communications device (e.g., a modem, a network card (wireless or wired), an infrared communication device, etc.), and working memory as described above. The computer-readable storage media reader may be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules including program modules, services, or other elements located within at least one working memory device, including an operating system and application programs, such as a client application or web browser. It should be appreciated that alternate embodiments may have numerous variations from that described above. For example, customized hardware might also be utilized and/or particular elements might be implemented in hardware, software (including portable software, such as applets), or both. Further, connection to other computing devices such as network input/output devices may be employed.

Storage media and computer readable media for containing code, or portions of code, may include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which may be utilized to store the desired information and which may be accessed by the a system device. Program modules, program components and/or programmatic objects may include computer-readable and/or computer-executable instructions of and/or corresponding to any suitable computer programming language. In at least one embodiment, each computer-readable medium may be tangible. In at least one embodiment, each computer-readable medium may be non-transitory in time. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

The use of the terms "a" and "an" and "the" and similar referents in the context of describing embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope unless otherwise claimed. No language in the specification should be construed as indicating any non-claimed element as essential to the practice of at least one embodiment.

Preferred embodiments are described herein, including the best mode known to the inventors. Variations of those preferred embodiments may become apparent to those of ordinary skill in the art upon reading the foregoing description. The inventors expect skilled artisans to employ such variations as appropriate, and the inventors intend for embodiments to be constructed otherwise than as specifically described herein. Accordingly, suitable embodiments include all modifications and equivalents of the subject matter recited in the claims appended hereto as permitted by applicable law. Moreover, any combination of the above-described elements in all possible variations thereof is contemplated as being incorporated into some suitable embodiment unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
   receiving a request to perform an action to a provisioned resource, the request including a verification mode token that indicates to evaluate the request in a verification mode; and
   as a result of authenticating the verification mode token:
      determining, from a set of stored policies, a subset of the set of stored policies applicable to the request;
      obtaining, from a set of stored decision data, a subset of the set of stored decision data that is relevant to the subset of stored policies;
      determining, based at least in part on the verification mode token, to replace the subset of the set of stored decision data with substitute decision data; and
      evaluating the request based at least in part on the subset of stored policies and at least the substitute decision data in the subset of stored decision data to produce an evaluation result;
      consequent to the verification mode, inhibiting fulfillment of the request;
      generating a verification mode report based at least in part on the evaluation result, the verification mode report including a mapping of the subset of stored policies to a set of user-specified policies; and
      providing the verification mode report in response to the request.

2. The computer-implemented method of claim 1, wherein the subset of stored decision data includes at least one of:
   a group memberships of a user
   a geographic region associated with the request, or
   a regulatory classification associated with the request.

3. The computer-implemented method of claim 1, wherein:
   the request further specifies an amount of detail for the evaluation result; and
   the verification mode report is generated in accordance with the amount of detail.

4. The computer-implemented method of claim 1, wherein:
   the computer-implemented method further comprising obtaining service provider operational information; and
   evaluating the request is further based at least in part on the service provider operational information.

5. The computer-implemented method of claim 4, wherein the service provider operational information includes an identification of a set of policy enforcement components involved in evaluating the request.

6. The computer-implemented method of claim 1, wherein authenticating the verification mode token further includes determining that replacement of the subset of the set of stored decision data with the substitute decision data is authorized to be performed for an entity associated with the request.

7. A system, comprising:
   one or more processors; and
   memory including executable instructions that, as a result of execution by the one or more processors, cause the system to:
      obtain a request that, if fulfilled, is operable to access a computing resource, the request including an indication to evaluate the request in a verification mode while inhibiting fulfilment of the request;
      responsive to the request:
         determine a policy applicable to the request;
         obtain decision data that is relevant to the policy;
         determine whether the request includes substitute decision data;
         produce an evaluation result by at least evaluating the request based at least in part on the policy and:
            the decision data, or
            the substitute decision data
         inhibit fulfillment of the request;
         generate, based at least in part on the evaluation result, a verification report that maps a user-specified to a stored policy of the set of stored policies; and
         provide, in response to the request, a notification indicating that the verification report is generated.

8. The system of claim 7, wherein the executable instructions further include instructions that cause the system to:
   receive an additional request to obtain the verification report; and
   provide, in response to the additional request, the verification report.

9. The system of claim 7, wherein:
   the request further indicates an amount of detail for the verification report; and
   the executable instructions that cause the system to generate the verification report further include instructions that cause the system to generate the verification report in accordance with the amount of detail indicated.

10. The system of claim 7, wherein the executable instructions that cause the system to provide the verification report further include instructions that cause the system to store the verification report in a location accessible to a user associated with the request.

11. The system of claim 7, wherein the decision data includes a name resolution map that resolves resource names to network locations.

12. The system of claim 7, wherein:
the request includes substitute decision data; and
the executable instructions further include instructions that cause the system to substitute the substitute decision data for at least a portion of the decision data.

13. The system of claim 7, wherein:
the indication is a verification mode token; and
the substitute decision data is encoded in the verification mode token.

14. The system of claim 7, wherein the verification result further includes service provider operational information that is usable to diagnose anomalous behavior.

15. A non-transitory computer-readable storage medium having stored thereon executable instructions that, as a result of being executed by one or more processors of a computer system, cause the computer system to at least:
receive a request to perform an action to a computing resource, the request including:
an indication to evaluate the request in a verification mode; and
a level of detail for a verification report;
on a condition that the level of detail is at least a first level, include a set of policies applicable to the request in a set of evaluation information;
on a condition that the level of detail is at least a second level:
if the request includes substitute decision data, substitute the substitute decision data for at least a subset of a set of decision data in the set of evaluation information; and
include the set of decision data that is relevant to the set of policies in the set of evaluation information;
evaluate the request based at least in part on the set of evaluation information to produce an evaluation result; as a result of the indication, inhibit fulfillment of the request;
generate a verification report based at least in part on the evaluation result, wherein the verification report maps a user-specified policy to a policy of the set of policies; and
in response to the request, notify a user of generation of the verification report.

16. The non-transitory computer-readable storage medium of claim 15, wherein:
the indication is provided by a verification mode token included in the request; and
the executable instructions further include instructions that cause the computer system to authenticate the verification mode token.

17. The non-transitory computer-readable storage medium of claim 15, wherein the set of decision data includes at least:
a network source address of the request, or
a protocol utilized to transmit the request.

18. The non-transitory computer-readable storage medium of claim 15, wherein the executable instructions further include instructions that cause the computer system to, on a condition that the level of detail is at least a third level, include service provider operation information in the set of evaluation information.

19. The non-transitory computer-readable storage medium of claim 18, wherein the service provider operation information includes an identification of a set of policy enforcement components in evaluation of the request.

20. The computer-implemented method of claim 15, wherein the level of detail for the verification mode report is based at least in part on at least one of:
basic contextual information,
an identity of a policy that was determinative of the evaluation result, or decision data that was determinative of the evaluation result.

* * * * *